(12) United States Patent
de Graaff et al.

(10) Patent No.: US 10,947,035 B2
(45) Date of Patent: Mar. 16, 2021

(54) COFFEE PAD FOR USE IN A COFFEE MACHINE

(71) Applicant: Koninklijke Douwe Egberts B.V., Utrecht (NL)

(72) Inventors: Gerbrand Kristiaan de Graaff, Utrecht (NL); Gustaaf Frans Brouwer, Utrecht (NL); Christiaan Johannes Maria Moorman, Utrecht (NL)

(73) Assignee: KONINKLIJKE DOUWE EGBERTS B.V., Utrecht (NL)

( * ) Notice: Subject to any disclaimer, the term of this patent is extended or adjusted under 35 U.S.C. 154(b) by 0 days.

(21) Appl. No.: 14/874,217

(22) Filed: Oct. 2, 2015

(65) Prior Publication Data

US 2016/0251151 A1   Sep. 1, 2016

Related U.S. Application Data

(63) Continuation of application No. PCT/NL2014/050208, filed on Apr. 3, 2014.

(30) Foreign Application Priority Data

Apr. 3, 2013   (NL) .................................. 2010560

(51) Int. Cl.
*B65D 85/80* (2006.01)
*A47J 31/06* (2006.01)
*B65D 85/804* (2006.01)

(52) U.S. Cl.
CPC ...... *B65D 85/8046* (2013.01); *A47J 31/0668* (2013.01); *A47J 31/0678* (2013.01); *B65D 85/8043* (2013.01)

(58) Field of Classification Search
CPC ............... A47J 31/0678; A47J 31/0673; A47J 31/0668; A47J 31/06; A47J 31/00;

(Continued)

(56) References Cited

U.S. PATENT DOCUMENTS 5,150,645 A    9/1992  Schlettecatte
5,242,702 A    9/1993  Fond
(Continued)

FOREIGN PATENT DOCUMENTS

AU    2009206182    7/2009
CN     1444894 A   10/2003
(Continued)

OTHER PUBLICATIONS

International Search Report and Written Opinion for International Publication No. PCT/NL2014/050208, dated Sep. 29, 2014, 20 pages.

(Continued)

*Primary Examiner* — Ericson M Lachica
(74) *Attorney, Agent, or Firm* — Foley & Lardner LLP

(57) ABSTRACT

Pad for use in coffee machine for preparing at least one part of a single beverage serving. In use, in the coffee machine an aqueous fluid such as water is supplied under pressure to the pad so that the fluid is forced through the pad for obtaining a beverage that then exits the pad. The pad includes a covering with an interior space that is filled with a beverage preparation product for preparing the beverage, which beverage preparation product is a product such as ground coffee extractable with a fluid, such as water. The covering is formed by an optionally disc-shaped first sheet and a rigid shell, wherein the first sheet and the shell around their adjacent perimeter edges are connected to each other. The shell is equipped with at least one outlet, wherein on the interior space of the pad in a bottom of shell a fluid collecting structure is provided, advantageously embodied as channels in fluid connected with the at least one outlet. The pad is equipped with a second sheet that is positioned on the bottom of the shell and covering the fluid collecting structure or the channels. The second sheet is located (Continued)

between the beverage preparation product and the shell, wherein the first sheet and the second sheet each form a filter permeable to a fluid such as water and beverage, which can pass and that forms a barrier for the beverage preparation product so that, when in use, a fluid fed under pressure at the first sheet of the pad flows through the first sheet to the beverage preparation product so that the beverage is formed which then flows through the second sheet and via the fluid collecting structure, such as the channels, and leaves the pad through the at least one outlet opening.

47 Claims, 21 Drawing Sheets

(58) Field of Classification Search
CPC .... A47J 31/3695; A47J 31/368; A47J 31/369; B65D 85/8046; B65D 85/8043; B65D 85/804
See application file for complete search history.

(56) References Cited

U.S. PATENT DOCUMENTS

| | | | |
|---|---|---|---|
| 5,472,719 A * | 12/1995 | Favre | A47J 31/0673 426/112 |
| 5,870,942 A | 2/1999 | Levi et al. | |
| 6,035,762 A | 3/2000 | Ruckstuhl | |
| 7,503,254 B2 | 3/2009 | Noordhuis | |
| 7,543,527 B2 | 6/2009 | Schmed | |
| 7,836,818 B2 | 11/2010 | Noordhuis | |
| 8,881,643 B2 | 11/2014 | Baldo et al. | |
| 2002/0022070 A1 | 2/2002 | Dijs | |
| 2003/0096038 A1 | 5/2003 | Cai | |
| 2003/0172813 A1 | 9/2003 | Schifferle | |
| 2004/0005384 A1 | 1/2004 | Cai | |
| 2004/0191372 A1 | 9/2004 | Halliday et al. | |
| 2005/0155494 A1 | 7/2005 | Brouwer et al. | |
| 2005/0158426 A1 | 7/2005 | Hu et al. | |
| 2006/0075903 A1 | 4/2006 | Dijs | |
| 2006/0230942 A1 | 10/2006 | Noordhuis | |
| 2007/0084352 A1 | 4/2007 | Yuen et al. | |
| 2008/0115675 A1 * | 5/2008 | Suggi Liverani | A47J 31/0663 99/289 R |
| 2008/0245236 A1 | 10/2008 | Ternite et al. | |
| 2009/0007793 A1 | 1/2009 | Glucksman et al. | |
| 2009/0022855 A1 * | 1/2009 | Steenhof | A23F 3/32 426/78 |
| 2009/0126577 A1 | 5/2009 | Ternite | |
| 2009/0178571 A1 * | 7/2009 | Brouwer | A47J 31/0678 99/302 R |
| 2010/0173055 A1 * | 7/2010 | Brouwer | B65D 85/8046 426/433 |
| 2010/0196545 A1 * | 8/2010 | Buffet | B65D 85/8043 426/79 |
| 2010/0239733 A1 | 9/2010 | Yoakim et al. | |
| 2010/0288131 A1 | 11/2010 | Kilber et al. | |
| 2011/0027425 A1 * | 2/2011 | Heijdel | A47J 31/0668 426/77 |
| 2011/0185910 A1 | 8/2011 | Ryser | |
| 2011/0274802 A1 | 11/2011 | Rivera | |
| 2012/0251671 A1 | 10/2012 | Kamerbeek et al. | |
| 2012/0328739 A1 * | 12/2012 | Nocera | A47J 31/3623 426/77 |
| 2013/0071532 A1 | 3/2013 | Pribus et al. | |
| 2013/0118360 A1 | 5/2013 | Dogan et al. | |
| 2013/0139699 A1 | 6/2013 | Rivera | |
| 2013/0243911 A1 | 9/2013 | Abegglen et al. | |
| 2015/0135968 A1 | 5/2015 | Gort-Barten | |
| 2015/0208852 A1 | 7/2015 | Doglioni Majer | |
| 2016/0137402 A1 | 5/2016 | Talon et al. | |
| 2016/0214788 A1 | 7/2016 | Kamerbeek et al. | |
| 2016/0257487 A1 | 9/2016 | De Graaff et al. | |
| 2016/0264347 A1 | 9/2016 | De Graaff et al. | |

FOREIGN PATENT DOCUMENTS

| | | |
|---|---|---|
| CN | 101389551 A | 3/2009 |
| CN | 103002781 A | 3/2013 |
| CN | 102481063 B | 6/2015 |
| EP | 0224297 A1 | 11/1986 |
| EP | 0904717 B1 | 7/2001 |
| EP | 1398279 A2 | 3/2004 |
| EP | 1 893 507 B1 | 3/2008 |
| EP | 2239212 A1 | 10/2010 |
| EP | 2236437 B1 | 3/2012 |
| EP | 2 743 206 A1 | 6/2014 |
| EP | 2 891 614 | 7/2015 |
| ES | 2234445 | 2/2005 |
| ES | 2398277 B2 | 12/2013 |
| FR | 2127329 | 9/1972 |
| WO | WO 2001/15582 | 3/2001 |
| WO | WO 2004/083071 A1 | 9/2004 |
| WO | WO 2006/043103 A1 | 4/2006 |
| WO | WO 2010/106516 A1 | 9/2010 |
| WO | WO 2011/039027 A1 | 4/2011 |
| WO | WO 2012/019902 A1 | 2/2012 |
| WO | WO 2013/021080 A1 | 2/2013 |
| WO | WO-2013/021080 A1 | 2/2013 |
| WO | WO 2014/158656 A1 | 10/2014 |
| WO | WO-2014/158656 A1 | 10/2014 |
| WO | WO 2014/163497 A1 | 10/2014 |
| WO | WO 2014/163498 A1 | 10/2014 |

OTHER PUBLICATIONS

International Preliminary Report on Patentability for PCT Appl. Ser. No. PCT/NL2014/050205 dated Oct. 6, 2015, (13 pages).
International Preliminary Report on Patentability for PCT Appl. Ser. No. PCT/NL2014/050207 dated Oct. 6, 2015, (7 pages).
International Preliminary Report on Patentability for PCT Appl. Ser. No. PCT/NL2014/050209 dated Oct. 6, 2015 (12 pages).
International Preliminary Report on Patentability for PCT Appl. Ser. No. PCT/NL2014/05206 dated Oct. 6, 2015, (12 pages).
International Preliminary Report on Patentability for PCT Appl. Ser. No. PCT/NL2014/05208 dated Oct. 6, 2015 (12 pages).
International Search Report and Written Opinion on PCT Appl. Ser. No. PCT/NL2014/050205 dated Sep. 26, 2014 (22 pages).
International Search Report and Written Opinion on PCT Appl. Ser. No. PCT/NL2014/050206 dated Sep. 29, 2014 (19 pages).
International Search Report and Written Opinion on PCT Appl. Ser. No. PCT/NL2014/050207 dated Jun. 16, 2014 (10 pages).
International Search Report and Written Opinion on PCT Appl. Ser. No. PCT/NL2014/050209 dated Sep. 29, 2014 (19 pages).

* cited by examiner

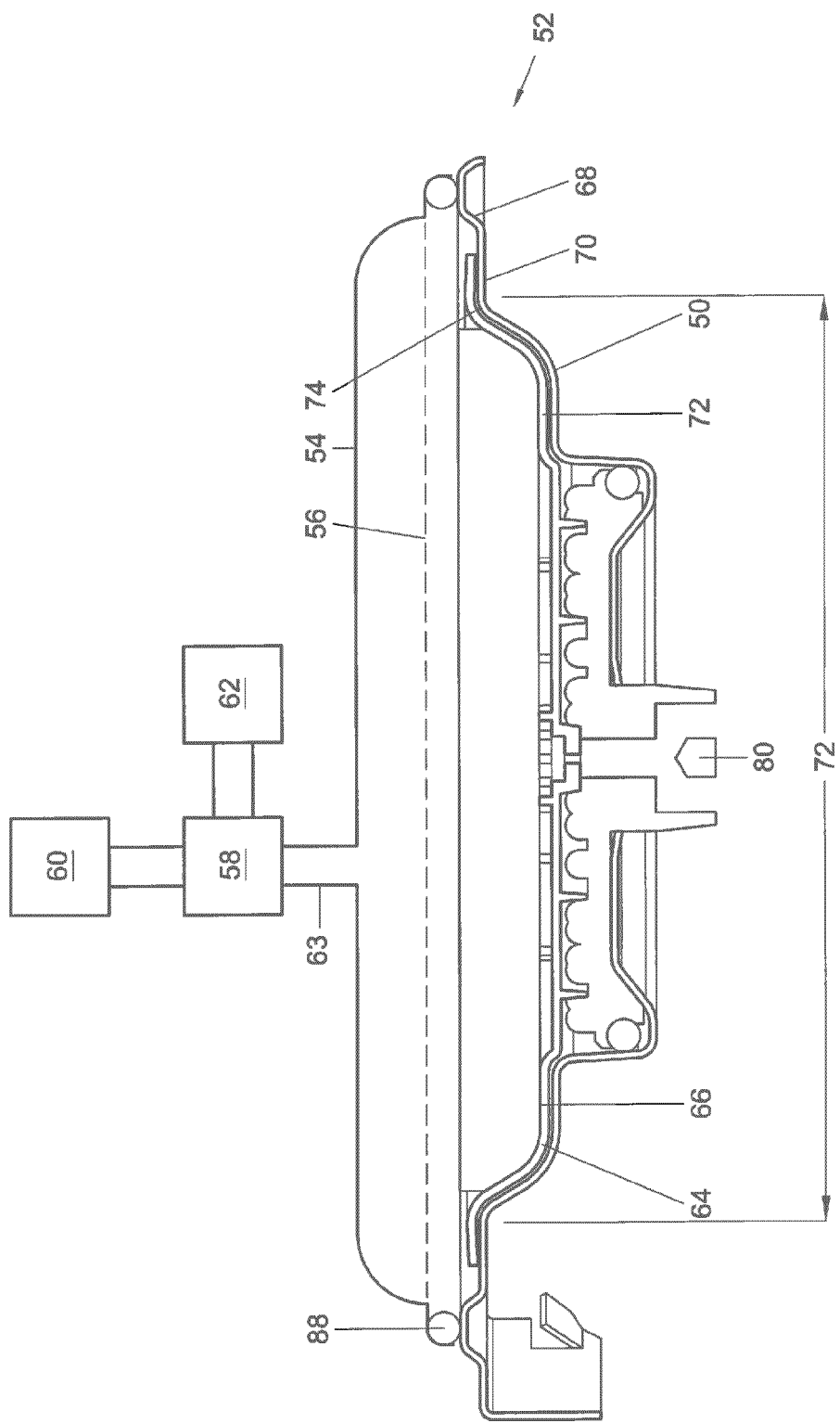

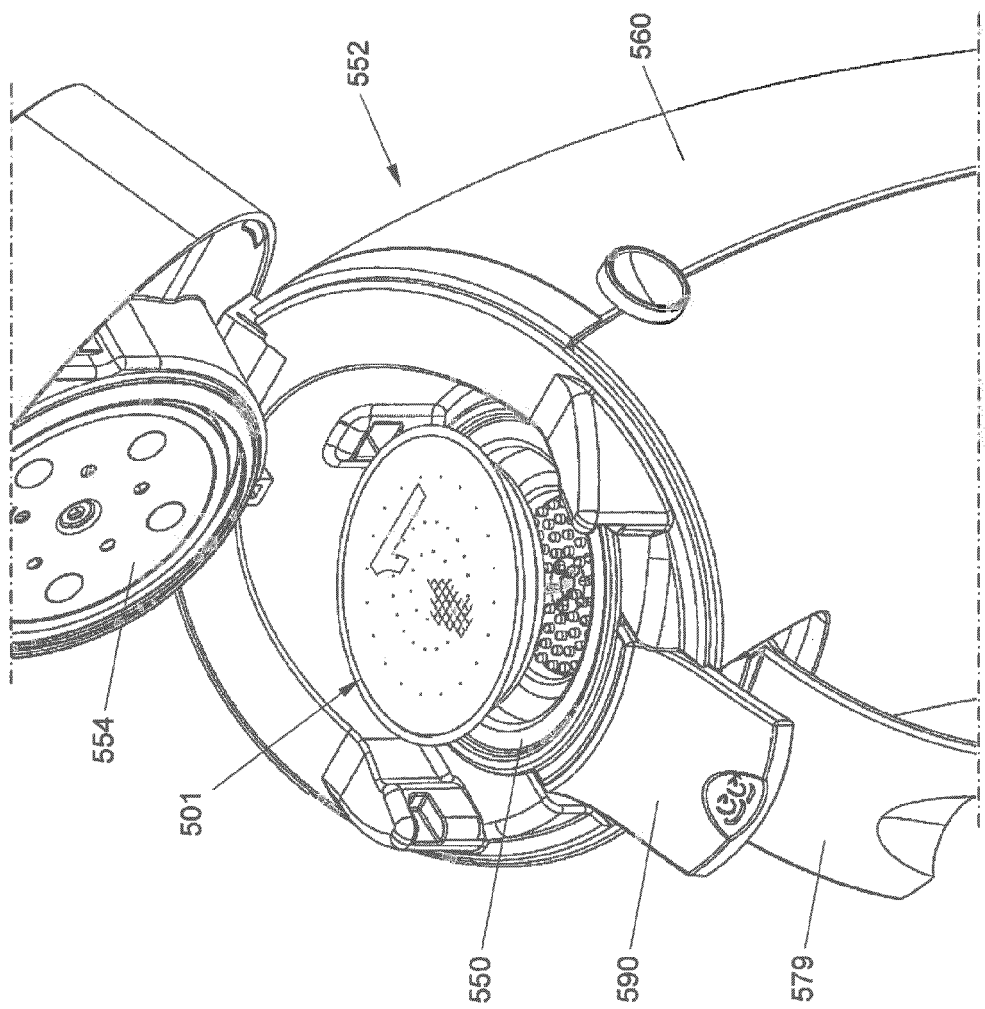
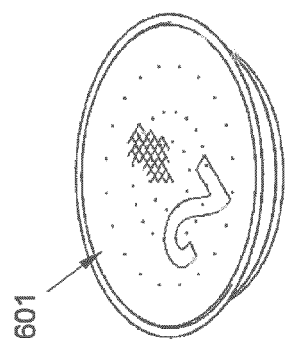
FIG. 21

COFFEE PAD FOR USE IN A COFFEE MACHINE

CROSS-REFERENCE TO RELATED PATENT APPLICATIONS

This application is a continuation of International Patent Application No. PCT/NL2014/050208, filed Apr. 3, 2014, which claims the benefit of priority to Netherlands Application No. NL2010560, filed Apr. 3, 2013, all of which are hereby incorporated herein by reference in their entireties.

BACKGROUND AND SUMMARY

The invention relates to a pad for use in coffee machine for preparing at least one part of a single beverage serving. In use, with the coffee machine an aqueous fluid such as water is supplied under pressure to the pad so that the fluid is forced through the pad for obtaining a beverage that then exits the pad. The pad includes a covering with an interior space that is filled with a beverage preparation product for preparing the beverage, wherein the beverage preparation product includes a product with a fluid to extract (and possibly to dissolve) such as ground coffee and wherein the covering for a part is formed by a first sheet.

Such pads usually are formed as pillow-shaped pouches that are not form retaining by themselves when subjected to mechanic or hydraulic forces.

The invention also relates to a system equipped with a coffee machine and such a pad.

In addition, the invention relates to the use of such a pad and a method for preparing a beverage with such a pad.

Finally, the invention relates to a kit of parts including such a pad.

Such a pad, system, method of operation and use is known from EP 0 904 717 A1.

The known pad can come with two sheets of filtering paper that are disc-shaped and are connected to each other adjacent their perimeter edges thereby forming a seal seam. The thus formed covering of the pad contains ground coffee. In use, the pad is placed in a holder which is then closed with a lid and then hot water is supplied to a top of the pad so that the hot water is pressed through the pad in formation of the beverage which beverage then leaves the holder through an outflow opening in the holder. It is important that when placing the flexible pad in the holder, the pad is manually well adapted to the form of the holder. Filtering paper when wetted usually provides a good fluid seal against a flat surface, such as a metal surface of a pad holder. It can however happen that the pad is slightly crumpled or folded when this is placed in the holder and then it should be "flattened". It is also important that the coffee bed remains homogeneously distributed in the pad during placement of the pad. Only such due care can prevent the bypass effect from occurring. Bypass means that hot water that is supplied to the upper side of the pad, flows around the pad to then leave the holder via the outflow opening thereof without passing through the pad. The consequence is that the beverage is diluted with hot water.

An object of the present invention is to further simplify the use of pads for the user.

Another objective is to increase the range of beverages that can be prepared with the typical Senseo® coffee machine using the pad according to the invention so one wishes. There has been a desire to be able to prepare different coffee varieties with the standard Senseo® machine, but the prospect of having a myriad variety of pad holders has slowed down the development of such options. Amongst such desirable varieties are smaller volumes of coffee beverage having a higher dry matter content and a stronger and more intense taste. Other desirable varieties include cappuccinos, latte macchiato, and Wiener melange, which are best prepared in a two-step process.

Also it is an objective to be able to determine in advance the properties of the beverage that is obtained using the pad within close tolerances.

In a more general sense it is thus an object of the invention to overcome or ameliorate at least one of the disadvantages of the prior art. Alternatively it is an object of the invention to at least provide the public with a useful alternative.

Accordingly the invention proposes a pad, a system including the pad, a use of the pad, methods for preparing a beverage with the pad and a kit of parts including the pad as defined in the appended claims.

The pad according to the invention is accordingly characterized in that its covering is formed by a flexible first sheet, preferably circular in shape, and a rigid shell wherein the sheet and the shell around their adjacent perimeter edges are connected to each other, in which the shell is equipped with at least one outlet opening and wherein preferably on the interior space of the shell in a bottom of the shell there is provided a fluid collecting structure, such as channels that are in fluid connection with the at least one outlet, wherein the pad is equipped further with a second sheet (preferably circular in shape) that is positioned on the bottom of the shell and preferably thereby covers the fluid collecting structure, such as the channels, wherein the second sheet is located between the beverage preparation product and the shell and wherein the flexible first sheet and the second sheet each form a filter permeable to a fluid such as water and beverage which can pass and that forms a barrier for the beverage preparation product so that, when in use, a fluid under pressure is fed at the flexible first sheet of the pad, the fluid flows through the first sheet to the beverage preparation product so that the beverage is formed, which beverage then flows through the second sheet and preferably through the fluid collecting structure, such as the channels and via the at least one outlet leaves the pad. Because the pad is equipped with a rigid shell, the pad, at least primarily, retains its shape which makes it possible that the pad is placed in the holder without there have to be given attention by a user whether it has the desired shape. Wherever in this specification the expression "shell" is used, it is to refer to a relatively rigid base member, which can have a hollow shape, but also can include a relatively flat bottom. The form of the pad is essentially fixed by the rigid shell. To permit use of a flow limiting restriction it is also important to enable a higher pressure drop across the restriction to be possible by a sufficiently tight seal between the pad and the holder in which it is placed.

Although a plurality of restricted outlet openings may be present, it is preferred that the pad comprises one restricted outlet opening. It is more preferred that this one outlet opening is positioned centrically in the bottom of the rigid shell.

The system according to the invention may advantageously have the shell at its exterior form a fluid seal with the holder so that a flow of the fluid from a top side of the pad around the pad to the at least one beverage exit opening of the pad holder is prevented. The seal formed between the pad and the holder is advantageously at least one of a static and a dynamic seal. A static seal can be formed between an outwardly directed perimeter flange of the pad and a confronting outer edge of the holder. With a dynamic seal the fluid pressure is used to improve contact between the shell and the holder. The rigid shell also ensures that at least a static fluid seal can be obtained between the pad and a holder to allow the increased pressure drop resulting from a restriction in the pad to build up. Generally an initial static sealing is required to enable an increased pressure drop to be created, while a dynamic sealing is advantageously employed to sustain the increased pressure drop. With dynamic sealing, the pressure drop itself is providing the sealing force, in that the more pressure drop there is across the shell during brewing, the higher the seal pressure between the pad and the pad holder.

By using a second sheet that is positioned on the bottom of the shell, it is also ensured that a beverage is obtained which properties can be specified within very narrow limits. After all, it is factory determined how the second sheet is positioned relative to the shell. This is in contrast to the known system in which a sheet of filtering paper of the pad is positioned on the bottom of a holder with this positioning in fact being determined by the consumer, at least in part thereof.

In a pad according to the invention, the second sheet may include filtering paper or other non-woven material, such as one that is biodegradable, comprising e.g. a PLA non-woven material. The second sheet thus can be flexible.

Further it may be noticed that the pad in combination with a pad holder of a coffee machine according to the invention, may further include means for establishing a laminar flow of beverage so that the pad can cooperate with a holder that has a foam creating nozzle and jet impact surface to create a foamy head on a beverage. Generally these means for establishing a laminar flow may require that length is added to a flow path for the beverage between the outlet opening of the pad and the foam creating nozzle of the holder, in particular an extended flow path for the beverage downstream beyond the at least one outlet opening of the pad.

More in particular it will then be advantageous, when the means for establishing a laminar flow includes at least one of a deflector and a labyrinth for converting the jet exiting from the restriction formed by the at least one outlet opening, as a turbulent flow, into a laminar flow. Such structures not only allow the flow path for the beverage to have an extended length, but also allow a cross sectional area of the flow path to increase downstream of the at least one outlet opening. Furthermore the initial turbulent flow of beverage thereby may also be distributed evenly. In this regard the pad and holder may have the deflector positioned downstream of the at least one outlet opening of the pad between the pad and the holder. Then the deflector may either be a deflector plate, or a deflector foil.

Alternatively the means for establishing a laminar flow of beverage may also be a labyrinth. in which case the labyrinth may advantageously be formed by at least one slotted circular rib adapted to extend in a recess formed between nipples protruding from a bottom of the holder, when the pad is inserted in the holder.

The known holder is fitted with grooves via which a beverage can leave the pad. Where normally the filter material of a conventional pad rests against the bottom of the holder at a location where no grooves are present, a sealing between the filtering paper and the bottom is obtained. If the sheet of filtering paper of the conventional pad is correctly positioned in the holder, the beverage can only leave the pad where the grooves are positioned. It is however possible that the pad is not entirely correctly positioned so that the beverage can also leave the pad at locations other than where the grooves are provided. This can result in a different quality beverage, for example because the water is only partially extracting the beverage preparation product and a remainder of the water is bypassing the pad and diluting the final brew. Because according to the invention the second sheet of the pad is positioned on the bottom of the interior space of the shell of the pad and covers the channels, the properties of the beverage that is defined are fixed within narrow limits.

In particular, it further applies that the at least one outlet in the shell includes a flow restriction for the beverage. If the coffee machine is time-controlled, that is, a pump of the machine is activated for only a predetermined period for preparing one or two cups of beverage, using the flow restriction the flow rate at which the fluid is forced by the pad and thereby the total volume can be predetermined. The flow resistance of the beverage preparation product in the pad can be many times smaller than the flow resistance of the outlet of the pad. The outlet of the pad then determines the flow resistance of the pad. It should be noted that the flow resistance of the pad can also be increased with a flow restriction at another location in the pad, such as at its inlet side. However this would be less preferred in connection with the present invention. Advantageously the at least one outlet opening in all the embodiments of the invention has its flow restriction with a diameter smaller than that of any nozzle of the outlet of the pad holder. More preferably the flow restriction has a diameter less than 0.83 mm, and preferably this diameter is within a range from 0.58 to 0.64 mm.

With the known system it is also known for the outlet of the holder to perform as a nozzle to generate a jet of the beverage. This nozzle forms a common system restriction to which the time controlled pump operation is adapted. With this jet of the beverage is created a beverage with a fine-bubbled froth because the jet of the beverage, for example, is impacting on a collision surface of the coffee machine. If such a system is used in combination with the pad according to the invention in which the outlet of the shell also forms a flow restriction, it opens the possibility to prepare with the pad a smaller volume of coffee with a higher dry matter content, giving an increased intensity and strength, and resulting in a more intense taste. Because in the pad the flow restriction is present, as has been said, the flow rate will decrease further relative to the known pad. This allows a machine that prepares a predetermined volume of coffee from a standard pad, to now prepare a smaller amount of beverage. With a standard pad a Senseo® machine, in a default setting, prepares for instance 110-130 ml coffee, while the same machine with a pad according to the invention prepares 20-50 ml, optionally 20-60 ml, less coffee beverage. This can result in a total amount of coffee of 60-110 ml, optionally 50-110 ml. With the holder also fitted with a flow restriction, the flow restriction of the holder and the flow restriction of the pad are so matched such that the mentioned amount of beverage is prepared. If the holder does not have a flow restriction but only with a relatively large outlet that forms no significant flow restriction for the mentioned beverages, the flow restriction of this pad can be adjusted such that yet the desired amount of beverage is prepared, for example for an amount of coffee as indicated above. In that case, the flow restriction on the pad determines itself substantially how much beverage there is prepared. Advantageously the at least one outlet opening in all the embodiments of the invention has its flow restriction with a diameter smaller than that of any nozzle of the outlet of the pad holder. More preferably the flow restriction has a diameter less than 0.83 mm, and preferably this diameter is within a range from 0.58 to 0.64 mm. It should be clear in this regard, that the opening and nozzle need not be circular and have a diameter. In that case a diameter of 0.83 mm corresponds to a through-flow opening having an opening area of 0.54 mm2. A range from 0.58 to 0.64 mm. would then correspond to a through-flow opening area from 0.26 to 0.32 mm2.

The pad according to the invention thus is applicable according to various embodiments in various type coffee machines. Because the rigid shell could also alter the pad according to the invention into a self-supporting pad, it is also conceivable that a modified pad holder can be employed. For instance such a pad holder, when the pad is self-supporting, could be reduced to a support ring, without bottom.

Preferably, the shell has a bowl-shaped interior. Preferably it also applies that one side of the shell forms an outer side of the pad. Because the shell forms an outer side of the pad, the form of the outside of the pad, is substantially defined on one side. This allows this form to be optimally tuned to a holder of a coffee machine in which the pad is intended to be used. In particular it applies that the shell at its underside forms a fluid seal with such holder so that the flow of the fluid from a top side of the pad, around the pad, to the outlet opening of the holder is prevented.

Preferably, it applies that the shell is equipped with a circumventing and in itself closed first bottom part with an outer edge and an inner edge and a dish-shaped second bottom part that connects to the inner edge of the first bottom part, wherein the dish-shaped second bottom part adjacent the inner edge of the first bottom part in a direction to an inner side of the pad, wherein the dish-shaped second bottom part adjacent the first bottom part in a direction oriented away from the outer edge down to an interior space of the pad slopes downwardly and wherein the at least one outlet is provided in the dish-shaped second bottom part. In particular it applies that the first bottom part is flat.

The static seal between the pad and the holder can advantageously be formed between an outwardly directed perimeter flange of the pad and a confronting outer edge of the holder. The dynamic seal uses the fluid pressure to improve contact between the shell and the holder. The more pressure drop there is across the shell during brewing, the higher the contact pressure between the substantially flat underside of the shell and the pad holder.

Furthermore, preferably the dish-shaped second bottom part adjacent the first bottom part in one of the outer edge down to an interior space of the pad-oriented direction slopes downwardly and there connects to a flat part of the dish-shaped second bottom part.

In this way, a bowl-shaped interior space is created in which beverages can be prepared in an optimal way. Experiments have shown that such a bowl-shaped interior space the quality of the beverage can be determined well in advance, this is partly because the so-called channeling is avoided. Channeling means that the bed of beverage preparation product that is in the pad, includes local unwanted smaller thicknesses then have a relatively small flow resistance. Since the fluid seeks the way of least resistance, it is likely that a portion of the fluid flows through the bed just at those places. There is a risk that the bed becomes even thinner so that the fluid then flows through the pad practical in its original state. The beverage will then be experienced as not very tasteful.

Preferably, the second sheet extends over the flat part of the dish-shaped second bottom part. In particular, it applies that the second sheet extends solely over the flat part of the dish-shaped second bottom part. Furthermore it applies here that preferably the channels extend in the flat part of the dish-shaped second bottom part. Because the second sheet conforms well with the dish-shaped second bottom part because the sheet is solely over the flat part of it, that in addition to this the channels only extend in the flat part, it will be ensured that the quality of the beverage that is prepared by the pad itself is determined in advance in high degree. After all, because the second sheet is solely over the flat part it will be achieved that the second sheet rests fully against the bottom. Because in addition the channels themselves are provided only in that part of the bottom it is achieved that the beverage, at least substantially, can flow only through the second sheet where the channels are located.

Preferably it also applies that the flexible first sheet is connected with the first bottom part. In particular it applies that the first bottom part is formed ring-shaped. In this way the first sheet can be attached well to the shell. Preferably, it also applies that the shell to its outer face is equipped with at least one substantially circular-in itself closed rib. Such at least one rib can further strengthen the pad. In addition, preferably the at least one rib of the pad that circumferentially extends into a recess located in the bottom of the holder of the coffee machine. As a result, the pad is well centered in the holder and with it the position of the pad in the holder is fixed. In addition, because the shape of the bottom of the pad, that is, the form of which is determined by the outside of the shell and the form of the holder are fixed in advance, these be well predetermined in advance. In particular, the coffee machine is equipped with a holder for receiving the pad, a lid for closing the holder and fluid supply means for generating a fluid flow under pressure, wherein the holder is equipped with at least one beverage exit opening and the lid features at least one fluid inlet opening which is in fluid connection with the fluid supply means for feeding the fluid flow to the fluid inlet openings so that the fluid is fed to the flexible first sheet of the pad under pressure so that the fluid is forced through the pad for the preparation of the beverage in the pad wherein the beverage leaves the pad via the second sheet, the channels of the pad and the outlet of the pad to then leave the holder via the at least one beverage exit opening of the pad holder. Preferably it also applies that an outer side of the shell has a shape that corresponds with the shape of the bottom of the holder. This allows the referred to seal to be realized optimally.

For the system according to the invention, the at least one outlet of the holder preferably includes a nozzle to generate a jet of the beverage. The system can also have an impact surface on which the jet impacts for beating air into the beverage in order to obtain a beverage with a fine-bubbled foam layer. However, it is also possible that the outlet is not equipped with a nozzle to generate a jet of a beverage. As said the outflow opening can be a large opening that forms no flow restriction. As mentioned, the pad can include a flow restriction instead that determines how much beverage will be prepared. However, it is also possible that in that case the flow restriction of the pad forms a nozzle to generate a jet of the beverage for preparing coffee with a fine-bubbled foam layer. An objective then could be an amount to obtain a café crème.

The invention further relates to a kit of parts that includes at least one pad as discussed above, which contains roast and ground coffee, and at least one further pad containing a soluble beverage preparation substance. The beverage preparation product soluble in an aqueous fluid of the further pad can be any soluble substance that comprises one or more from the group consisting of a chocolate ingredient, instant milk powder/creamer, optionally in combination with sugar or flavors. It is in particular advantageous when the soluble substance is instant milk powder/creamer. With such a kit of parts it is now also possible to prepare a single serving of beverage in a two-step process such as a dairy or dairy replacement containing beverage. Such beverages can include cappuccino, latte macchiato, wiener mélange, or like beverages. The kit of parts according to the invention, can further include a package containing at least one pad as discussed above and the at least one further pad. More advantageous each package will contain a first plurality of pads as discussed above, and a second plurality of further pads. Preferably the pad as discussed above, and the further pad are each appropriately marked as a primary pad or a secondary pad for a two-step beverage preparation process. In a particularly preferred kit of parts according to the invention, the pad according to the invention is the secondary pad and the further pad is the primary pad. By introducing first a beverage prepared from a dairy or dairy replacement product in a cup and secondly a beverage prepared from roast and ground coffee, the white foam head of the previously prepared dairy or dairy replacement product, e.g. the milk powder/creamer ingredient, will float on the coffee extract. Beverages such as cappuccino, latte macchiato, or wiener mélange can then be prepared with visual separate layers. The further pad may be a pillow-shaped pouch known in the art. Preferably, the further pad may be a pad comprising two sheets of filtering paper connected to each other forming an interior space which interior space comprises a form providing stiffening body such as described in EP-A-1 398 279, US 2011/0027425, and PCT/NL2012/050765. More preferably, the further pad is also a pad as discussed above comprising a soluble beverage preparation product instead of roast and ground coffee. Such a pad is described in co-pending application entitled "Pad comprising a soluble beverage preparation product for use in a coffee machine", which is herewith included by reference.

Optionally an additional permeable spacer filter can be interposed between the beverage preparation product and the first sheet. The interior space of a pad necessary to accommodate a soluble beverage preparation substance, such as a creamer, is usually larger than the space necessary to accommodate an extractable beverage preparation substance, such as ground coffee. In a two-step beverage preparing process it may be preferable to employ uniform pad sizes for the primary and secondary pads irrespective of the beverage ingredient contained in the pad, e.g. in a package containing a first plurality of pads as discussed above, and a second plurality of further pads it allows stacking of the respective pads at the same height. During brewing a problem of channel forming may then occur when ground coffee is accommodated within a space that is large enough to hold a creamer ingredient. To avoid this problem the additional spacer filter enables a bed of ground coffee to be contained in a rigid shell, which is of a size large enough to be filled with a soluble creamer, when the additional spacer filter is not used. The coffee bed is retained by the spacer filter, so that the coffee bed cannot be disturbed by the hot water that in use permeates under pressure through the first filter sheet. This prevents channel forming, which would have an adverse effect on the taste of the beverage. The spacer filter can conveniently be made from any suitable porous or perforated flexible, semi-rigid, or rigid material. In an alternative embodiment of the pad which comprises the spacer, preferably flexible porous material such as paper filter, the first filter sheet may be deleted so that the spacer filter in fact functions also as the first filter sheet.

To all the pad embodiments described above it applies that some form of packaging will be required for shipment and for extended shelf live. It is for instance possible that the pad is contained in an airtight wrapping prior to use to improve shelf-life. The wrapping may hold one single pad, but also a combination of pads intended to be used in the preparation of one single beverage serving. The pad may also individually comprise a bottom seal. The bottom seal then closes off the outlet side prior to use. The bottom seal is at least partially removable from the bottom of the pad by peeling and can have a lip to enable easy removal by a user of the pad. The pad may further need a top seal that closes off the first sheet prior to use. The top seal is also at least partially removable from the pad by peeling and can also have a lip for easy removal by a user. The removably connected bottom seal and top seal improve shelf life of the product inside the pad by preventing air to enter the pad via inlet and outlet openings. In a special variant the lip of the bottom seal can be connected to the lip of the top seal. Thereby the bottom seal and the top seal can be made unitary, so that a user cannot accidentally forget to remove one of the bottom or top peel seals. When using airtight peel seals, a packaging holding one or more pads then does not have to be airtight. A package for holding one or more pads, may be in the form of a box, can or bag. When in the form of a box or can, the pads can conveniently be arranged in stacks. When the pads are not individually wrapped or provided with peel seals, the package holding a plurality of unwrapped pads needs to provide a barrier to oxygen and humidity. Moreover it may then be desirable to also include one-way valve means to enable any gases, such as emanating from roast and ground coffee, to escape. This would prevent any gas pressures to build up within the package. Such devices are known in the art.

BRIEF DESCRIPTION OF THE DRAWINGS

The system will now be clarified in reference to the drawings, in which:

FIG. 6 is a schematic illustration of a coffee machine with the assembly of FIG. 4A;

FIG. 21 is a perspective fragmentary view of a coffee machine and pad holder, ready to perform a two-step beverage preparing process with at least one pad according to the invention;

DETAILED DESCRIPTION

Figure 1:
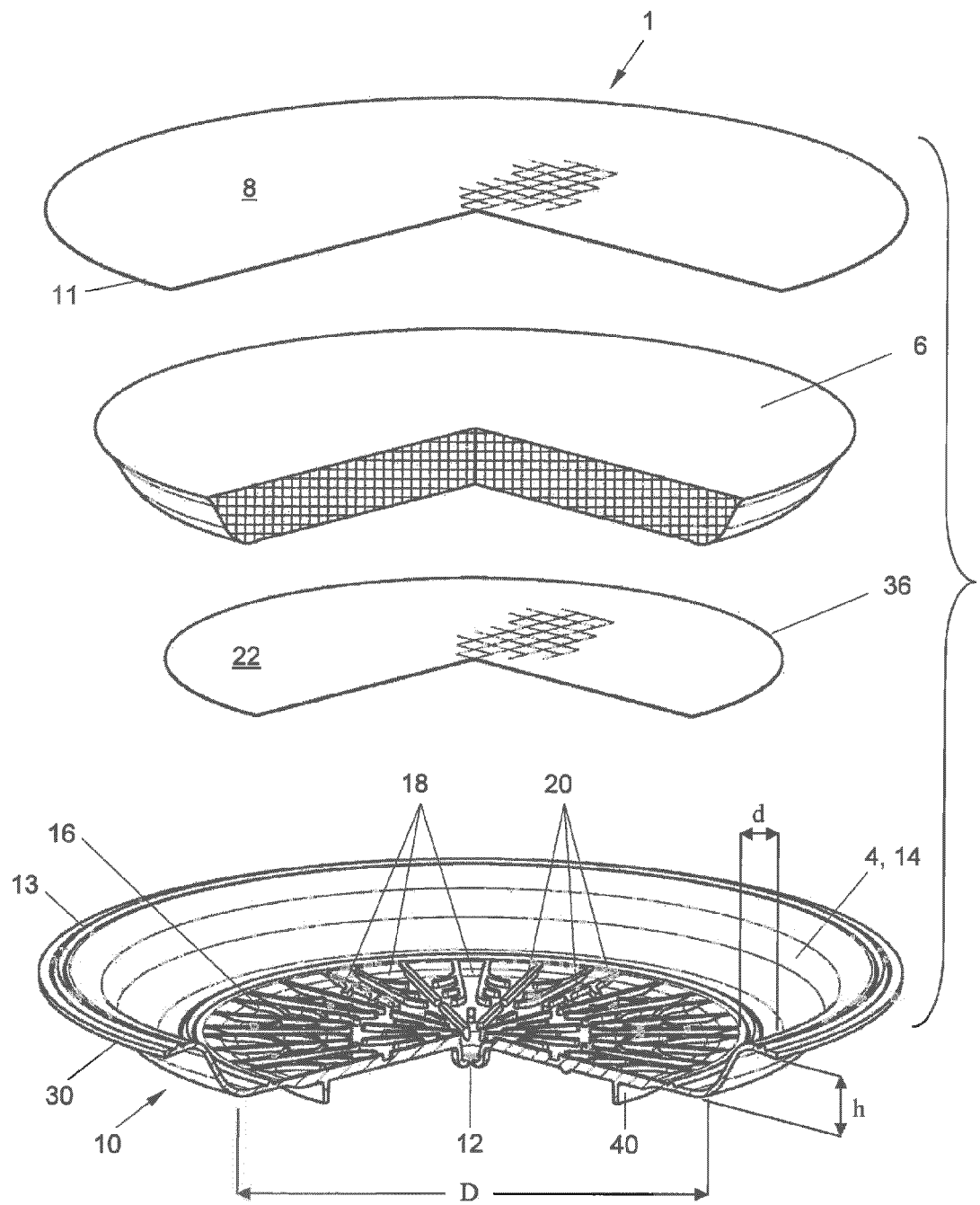
FIG. 1 is an exploded view, partly in cross section, of a first pad according to the invention.

Indicated in FIG. 1 with reference number 1 is a pad for use in a coffee machine for preparing one or two cups of beverage. The pad 1 is shown in exploded view and is provided with components forming a covering (reference numeral 2 in FIGS. 2 and 3) to define an interior space 4 which is filled with a beverage preparation product 6. FIG. 1 shows the components of the pad 1 partly in cross section. The pad in its fully assembled form is shown in FIGS. 2-4B. The beverage preparation product 6 such as ground coffee is intended for preparing a beverage by extraction thereof with a fluid such as hot water. The covering 2 is formed by a first disc-shaped sheet of 8 and a disc-shaped rigid shell 10. The flexible first sheet 8 and the rigid shell 10 are connected to each other adjacent their perimeter edges 11, 13. The connection can be established using glue, welding, or, for example, heat sealing. Such bonding techniques are well known to those skilled in the art and need no further explanation. The rigid shell 10 is made of a plastic, more particularly of PP, or for instance cardboard or a bio-based plastic material. Thereby, the shell preferably is substantially impermeable to aqueous fluids. The shell 10 is equipped with at least one outlet opening 12, forming a restriction. A standard Senseo® coffee machine, in a default setting, prepares 110-130 ml of beverage. For the at least one outlet opening 12 to form a restriction, it needs to have a diameter less than 0.83 mm, and for the present invention preferably within a range from 0.58 to 0.64 mm. On the inner side 14 of the shell 10 at a bottom 16 of the shell 10 are arranged channels 18, which are in fluid connection to the at least one outlet opening 12 to form a beverage or fluid collecting structure. The channels 18 in this example extend generally in radial direction with respect to the outlet opening 12 and are formed by In this example the at least one outlet indicates a flow restriction for the beverage. In this example, a flow restriction is formed because the outlet has a sufficiently small diameter to form a flow restriction. As a result, the stromingsweerstand restriction at a coffee machine for timed the flow rate of the fluid goes down with the result that a metered, relatively small amount of fluid by the pad is pressed. In this example, for instance between 15 and 30 mm. for manufacturing an espresso with this example the beverage preparation product consists of ground coffee. This example applies furthermore that the scale is a bowl-shaped interior space 4. A page 24 of the scale is the outside of the path. The scale is equipped with a revolving and in itself closed first bottom part 26. The first bottom part 26 is in this example, ring-shaped, and includes an inside border 28 and an outdoor edge 30 (see FIG. 8).

a plurality of elongate protrusions or ridges 20. Between the protrusions 20 the channels 18 are formed. In this example, the top of the protrusions 20 is regarded as the bottom of the rigid shell 10.

The pad has a second disc-shaped sheet 22 that is positioned at the bottom of the shell, as formed by the ridges 20, and covers the channels 18, supported by the ridges 20. A horizontal distance between the ridges 20, their position and height, is arranged such that in combination with the material characteristics of the second sheet 22 this will be fully supported and will not sag into the channels 18 so as not to impede the fluid flow to the outlet opening 12. Attachment of the second sheet 22 around its perimeter to the shell 10 and/or to the protruding ridges 20 may preferably be employed to further ensure this function. As it can be seen in FIG. 1, the second sheet 22 is positioned between the beverage preparation product 6 and the shell 10. The flexible first sheet 8 and the second sheet 22 each form a filter for allowing a fluid such as water and extracted beverage to pass, but which forms a barrier for the beverage preparation product 6. In this example, both sheets 8, 22 are of a flexible material, in the sense that it can be bended and folded, but offers little or no resiliency. One and the other ensures that in use, when a fluid under pressure is fed to the flexible first sheet 8 of the pad 1, the fluid flows through the first sheet 8 to the beverage preparation product 6 so that the beverage is formed, which beverage then flows through the second sheet 22 via the channels 18, the at least one outlet 12, and leaves the pad 1.

In this example the at least one outlet 12 includes a flow restriction for the beverage. A flow restriction is formed in that the outlet 12 has a sufficiently small diameter to form a flow restriction. As a result, the flow restriction, when used in a coffee machine with a time controlled flow of fluid, the flow rate will reduce with the result that in total only a relatively small amount of fluid is metered and pressed through the pad. In this example, for example between 50 and 110 ml, and preferably 75-95 ml for manufacturing a special quality coffee beverage with, in this example, the beverage preparation product 6 consisting of ground coffee.

In this example it applies furthermore that the shell 10 defines a bowl-shaped interior space 4. An outer side 24 of the shell 10 forms the outer side of the pad 1. The shell 10 is equipped with a circumventing and in itself closed first bottom part 26. The first bottom part 26 in this example, is ring-shaped, and includes an inner edge 28 and an outside edge 30 (see FIG. 2).

Furthermore, the shell 10 includes a dish-shaped second bottom part 32, which connects to the inner edge 28 of the first bottom part 26. The dish-shaped second bottom part 32 extends in a direction away from the inner edge 28 of the first bottom part 26, which direction also is directed inwardly towards an interior space of the pad 1 in a downward direction. The mentioned direction in this example is in fact the radial direction of the disc-shaped shell 10 to the outlet 12.

Figure 2:
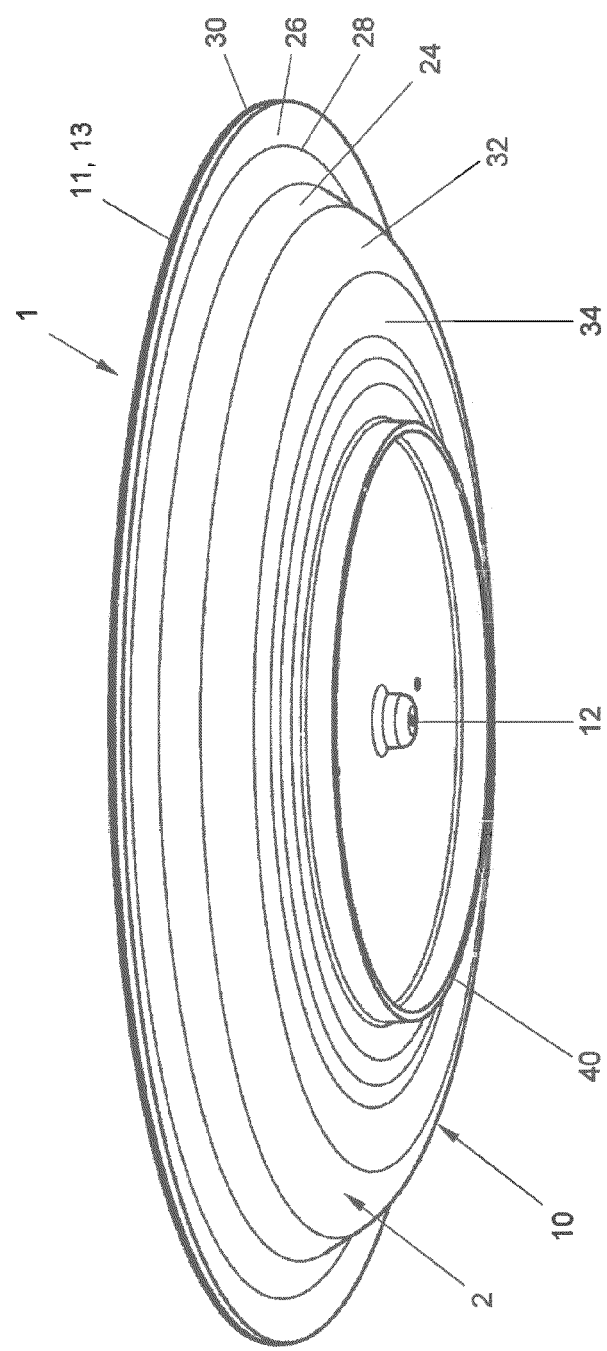
FIG. 2 is a perspective view from below showing a shell of the first pad of the invention.

As best seen in FIGS. 1 and 2, the at least one outlet 12 is positioned in the dish-shaped second bottom part 32.

The first bottom part 26 is as shown in FIG. 2, is substantially horizontally oriented. As said, the dish-shaped second bottom part 32 adjacent the first bottom part 26 extends in a direction away from the inner edge 28 oriented towards the interior space of the pad downwardly. This sloping area is indicated in FIG. 1 as h. The sloping area h connects to a flat part of the dish-shaped second bottom part 32, which flat part in the drawing is referred to with D. The second sheet 22 extends only over the flat part D of the dish-shaped second bottom part 32.

The mentioned channels 18 extend only in the flat part D of the dish-shaped second bottom part 32. Each channel 18 extends at a distance from a circumferentially closed outer edge 34 of the flat bottom part in the direction of the at least one outlet 12. A smallest distance between an end of each of the channels 18 and the outer edge 34 of the flat part of the second bottom part 32 is greater than ten percent of a maximum diameter in the horizontal direction of the flat part of the dish-shaped second bottom part 32. In the drawing this maximum diameter is indicated with D (FIG. 1).

Figure 3:
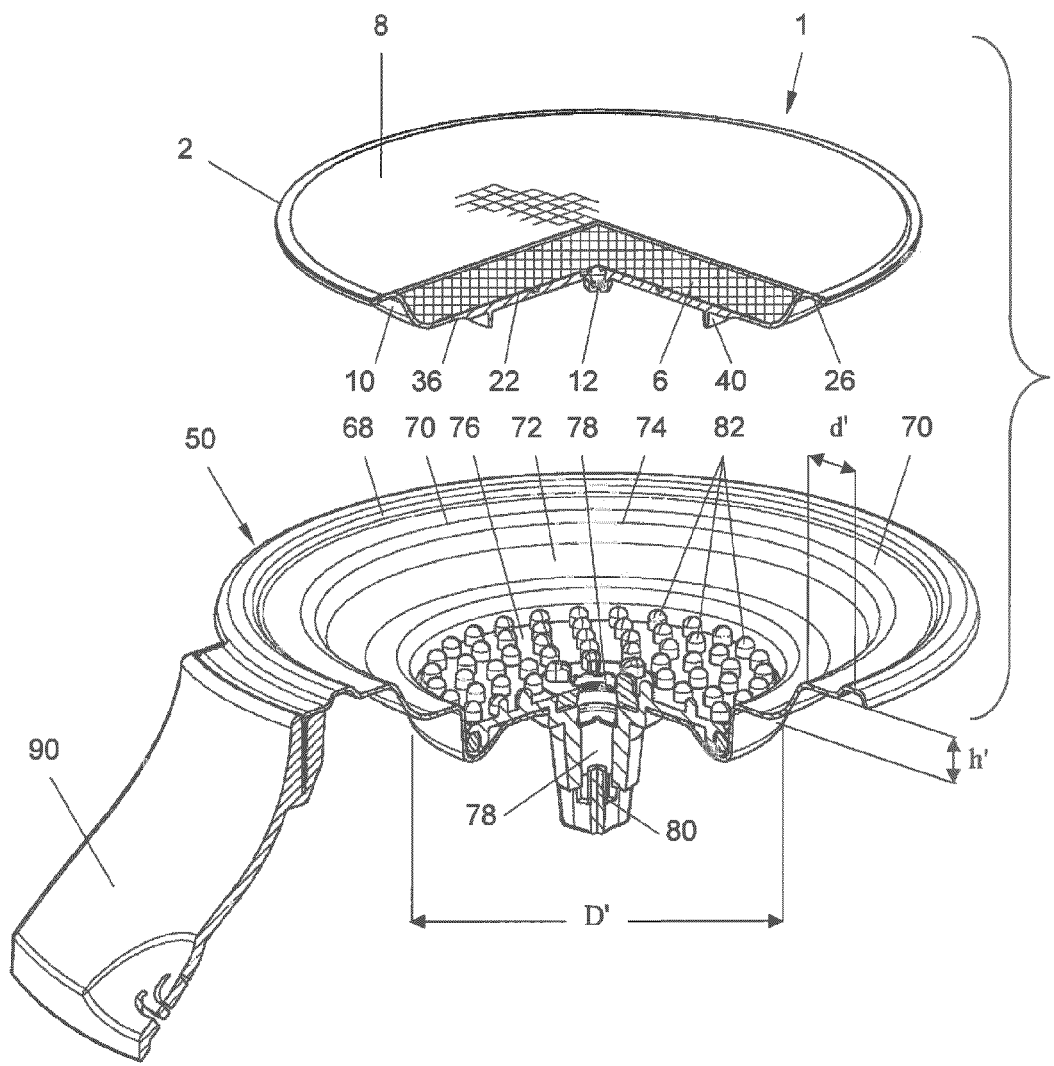
FIG. 3 is a perspective view, partly in cross section, of the first pad of the invention in position for insertion into a pad holder of a coffee machine.

As can be seen in FIGS. 1 and 3 the flexible first sheet 8 is connected with the first bottom part 26. This connection can for example be by gluing or heat sealing, as is conventional. The flexible first sheet 8 and the second sheet 22 border directly to the beverage preparation product 6. In this example, 6-8 gram extractable product that is 6-8 grams of ground coffee will be present. Conceivably other amounts of beverage preparation product, such as 5-10, and preferably 6-9 gram are also possible. The second sheet 22 adjacent to its circumferential in itself closed perimeter edge 36 is connected with the shell 10, in this example, with the flat part of the second bottom part 32. This connection can also, for example, be achieved by conventional gluing or heat sealing. Moreover, in this example, it applies that both the flexible first sheet 8 as the second sheet 22 are made of a non-woven material, more particularly of filtering paper. The filtering paper includes in this example at least 70% and even at least 80% cellulose. Other possibilities include a 100% PP/PET based non-woven materials, biodegradable non-wovens, and PLA-like filtering materials. Evidently other materials or substrates permeable to aqueous liquids, such as a mesh, are also possible.

The shell 10 on its outer side 24 is also equipped with at least one circular in itself closed rib 40 for reinforcing the shell. As an alternative to reinforcement, or in addition thereto, the circular rib 40 can also assist in positioning of the pad into a pad holder. A mating fitment of the circular rib 40 with a complementary recessed structure on a bottom of a pad holder can also be used to prevent placement in pad holder variants that are not intended to cooperate with the subject pad.

The pad 1 is suitable for use in an itself known manner. For example the pad can be placed in a holder that is equipped with at least one beverage exit opening. The holder containing the pad is closed with a lid that is equipped with at least one fluid inlet opening. Next, a fluid under pressure to the fed to the at least one fluid inlet opening so that the fluid is fed via the flexible first sheet to the beverage preparation product in the pad. Here the beverage preparation product is extracted with the fluid. The fluid in this example is hot water. By extraction a beverage is created, which beverage leaves the pad via the second sheet, the channels and the at least one outlet. Thus the beverage flows from the bottom of the pad in the holder and then leaves the holder through the at least one beverage exit opening. An example of this is discussed on the basis of FIGS. 3 to 6.

Figure 4A:
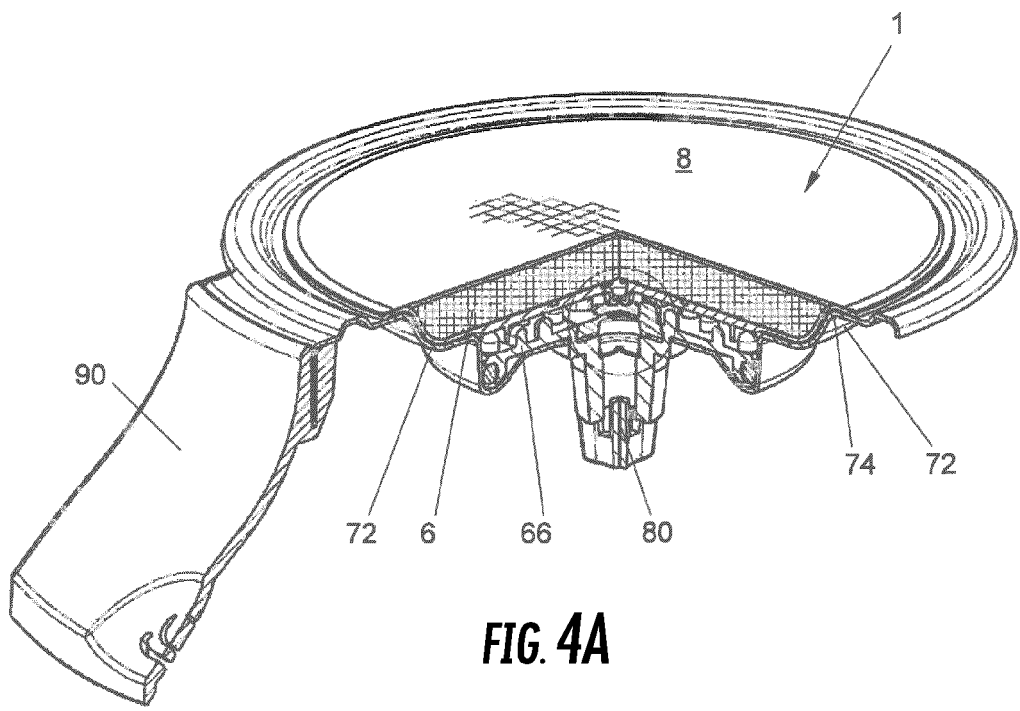
FIG. 4A is a perspective view, partly in cross section, of the first pad of the invention accommodated in the holder of a coffee machine.
Figure 4B:
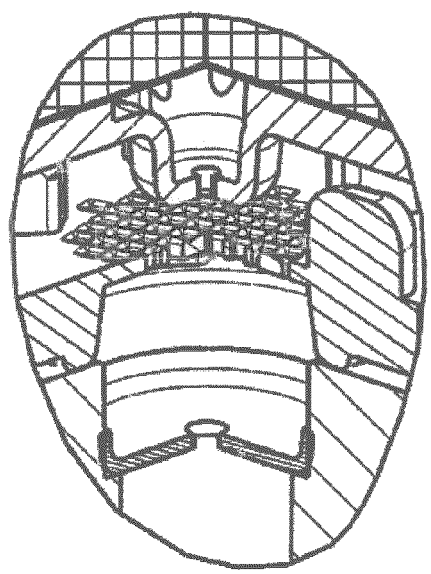
FIG. 4B is a detail on an enlarged scale of FIG. 4A showing the relative position of the restriction of the first pad of the invention and the restriction of the holder.

In FIGS. 4-6 the holder 50 from a coffee machine or coffee machine 52 is shown, with the pad 1 accommodated in the holder 50. In addition, the coffee machine 52, as shown in FIG. 6, features a lid 54 equipped with a plurality of fluid inlet openings 56. The coffee machine 52 is equipped with a pump 58 and a reservoir 60 for the supply of hot water. Also the coffee machine 52 is equipped with a control unit 62. The pump 58 is in fluid connection with the lid 54 via a tube 63. The holder 50 comes with a bowl-shaped interior space 64 bounded by a bottom 66 of the holder and an upstanding side wall 68 of the holder. The bottom 66 of the holder is equipped with a circumferential in itself closed first bottom part 70 which is adjacent to the side wall 68 of the holder. The first bottom part 70, in this example, is ring-shaped and flat. The bottom 66 of the holder is part of a dish-shaped second bottom part 72 wherein the dish-shaped second bottom part 72 of the holder adjacent the first bottom part 70 of the holder in a direction oriented away from the side wall 68 of the holder slopes downwardly. In other words, the dish-shaped second bottom part 72 slopes in a radial direction oriented to the interior space 64 of the holder 50. The area that slopes in FIG. 3 is indicated with h'. As best shown in FIGS. 3 and 6 the dish-shaped second bottom part 72 borders to an interior space edge 74 of the first bottom part 70. The first bottom part 70 of the holder 50 is horizontally oriented and has a width that in FIG. 3 is indicated with d'. In addition, the dish-shaped second bottom part 72 of the holder is provided with grooves 76, which form a fluid path to the at least one outlet 78 of the holder. The dish-shaped second bottom part 72 of the holder includes an inner flat bottom part with a diameter D', of which the grooves are provided in the inner flat bottom part (see FIG. 3).

The at least one outlet 78 of the holder in this example is provided with a nozzle to generate a jet of the beverage. The holder in this example is equipped with an impact surface 80 (see FIGS. 3, 4 and 6) upon which the generated jet impacts for beating air into the beverage for obtaining a beverage with a fine-bubbled foam layer. Thereby air is mixed into the beverage at the cylindrical wall of the outlet 78 that surrounds the impact surface 80. The pad 1 rests on the bottom 66 of the holder wherein the shell itself coextends with the bottom 66 of the holder to adjacent the upstanding side wall 68 of the holder. The first bottom part 26 of the pad 1 rests on the first bottom part 70 of the holder. This involves that the outside of the shell has a shape that corresponds with the shape of the bottom 66 of the holder. As it can be seen in FIGS. 4 and 6 the at least one circular rib 40 of the pad extends into at least one recess that is formed in the bottom 66 of the holder for centering the pad in the holder.

In this example, as best seen in FIG. 3, grooves 76 are formed between a plurality of nipples 82 protruding from the bottom 66 of the holder. The tips of the nipples 82 form part of the bottom 66 of the holder, in particular are part of the flat part (indicated by D') of the bottom 66 of the holder. The bottom at least in part is smooth and is made of plastic and/or metal. The top of the nipples are smooth, just like the rest of the bottom.

The mentioned at least one recess in which the at least one rib 40 of the pad extends are also formed by the nipples 82. The system described up to this point works as explained below.

A user opens the lid and then places a pad in the holder 50. Thereby the pad will automatically assume its correct position relative to the holder by the ribs engaging into the corresponding recesses in the bottom 66 of the holder. The holder is then closed with the lid 54. Then a user can control the control unit 62. As a result, the pump 58 starts and hot water from the reservoir 60 will be supplied for a predetermined time period to the cover 54 through the tube 64. The hot water, that is, the fluid, will then be fed to a top of the pad through the fluid inlet openings 46. The hot water enters the pad through the flexible first sheet 8. After this the hot water comes into contact with the ground coffee so that coffee extract is formed. This coffee extract will flow through the second sheet 22 at those positions where the channels 18 of the shell 10 are located. At positions where the second sheet 22 rests against the bottom 16 of the shell there will, at least substantially, flow no beverage through the second sheet 22. The beverage then flows through the channels 18 to the outlet 12 of the pad. In this example, the flow resistance of the outlet 12 is greater than the flow resistance of the coffee bed that is formed by the ground coffee 6. The flow resistance of the coffee bed 6 will have a neglected influence in the determination of the flow rate of the hot water that flows through the coffee pad. Then the beverage will end up in the holder and leave the holder via the outlet 78 of the holder. It is further noted that the pad and the holder form a fluid seal where the pad is in contact with the bottom 66 of the holder. It is noted that the grooves 76 of the holder have no particular role here. The pad and the holder form a fluid seal, which is reinforced by the pressure drop over the pad and properties of the rigid shell, that permit the shell to soften slightly at the brewing temperature and conform its shape to that of the pad holder.

Figure 5A:
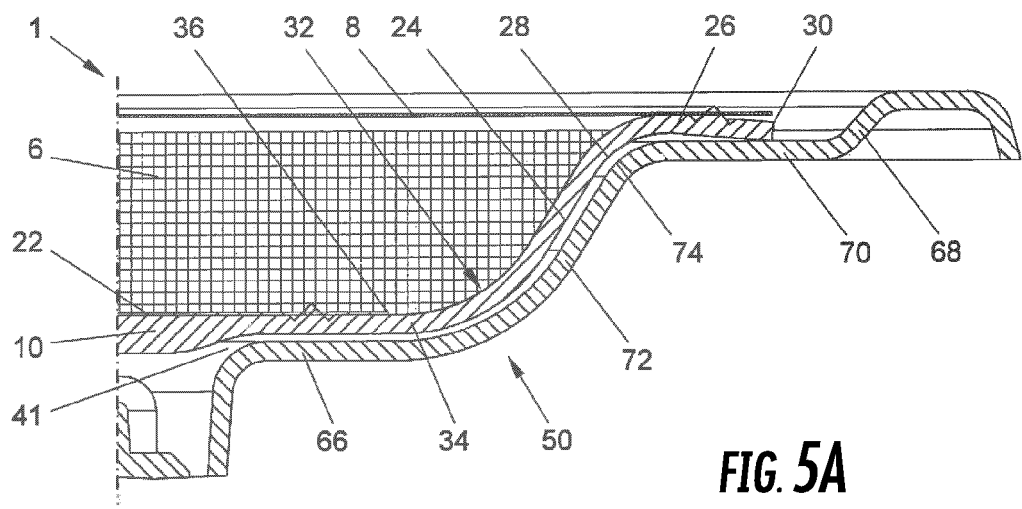
FIG. 5A is a partial transverse cross sectional view of the pad of the invention accommodated in the holder, without fluid pressure, forming a static fluid seal
Figure 5B:
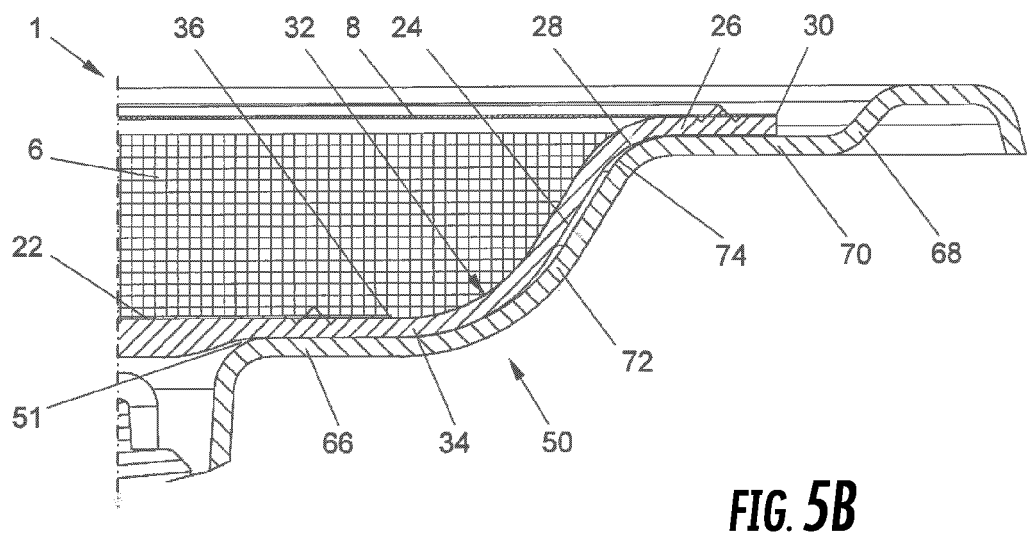
FIG. 5B is view similar to FIG. 5A, but pressed down by fluid pressure and forming a dynamic fluid seal.

As best seen in FIGS. 5A and 5B, the pad 1 and the holder 50 form a fluid seal, which is reinforced by the pressure drop over the pad 1 and by properties of the rigid shell 10, that permit the shell 10 to soften slightly at the brewing temperature and conform its shape to that of the second dish or bowl-shaped bottom part 72 of the pad holder 50. In FIG. 5A the pad 1 is shown when accommodated in the holder 50, without fluid pressure, and forming a static fluid seal. The static seal between the pad 1 and the holder 50 is formed between an outwardly directed perimeter flange (first bottom part 26) of the pad 1 at its outer perimeter edge 30 and a confronting outwardly directed flange 70 (circumferential first bottom part) of the holder 50. Sufficient static sealing may already be obtained by gravity through the weight of the pad 1 being supported on the outwardly directed flange 70 of the holder 50 via the outer edge 30 of the pad 1. As shown in FIG. 5A the outwardly directed perimeter flange of the pad, formed by the first bottom part 26 of the shell 10, inclines slightly downwardly, so that initial contact with the flange 70 of the holder 50 will be through the outermost perimeter edge 30 of the pad 1. It is further seen in FIG. 5A that still a gap 41 exists between the remainder of the rigid shell 10 and the second bottom part 72 of the holder 50. In FIG. 5B the pad 1 in the holder 50 is shown, when pressed down by fluid pressure and forming an additional dynamic fluid seal, in that the flat bottom part of the shell 10 now firmly contacts the bottom 66 of the holder 50. Initial contact between the flat bottom part of the shell 10 and the bottom 66 of the holder will start at a point indicated with 51, where the deflection of the shell 10 under pressure forces its bottom part against the holder 50. The dynamic seal uses the fluid pressure to improve contact between the shell 10 and the holder 50. The more pressure drop there is across the shell 1 and its beverage preparation product 6 during brewing, the higher the contact pressure will be between the flat underside of the shell 10 and the pad holder 50. It is thereby prevented that any hot water fed to the top of the pad can flow directly to the outlet 78 of the holder 50 by bypassing the pad 1. The beverage can thus only flow through the outlet 78 of the holder 50.

The beverage can then be collected in a cup that is placed under the holder 50. The grooves 76 of the holder when using the pad 1 play no important role. As will be discussed these grooves do play a relevant role when the system is extended to include another type of in itself known coffee pad.

In particular also the outlet 78 of the holder 50 can still have a restriction.

The coffee machine of FIG. 6 is also suitable to cooperate with a conventional coffee pad that includes a flexible first sheet and a flexible second sheet between which the ground coffee is located. This first sheet second sheet are each manufactured of flexible filtering paper and are connected to each other adjacent their perimeter edges, as explained in EP 0 904 717. Such conventional pads are generally formed as pillow-shaped pouches. If this conventional coffee pad is placed in the holder, when the user will make sure for example that the second sheet of the coffee pad coextends with the bottom 66 of the holder to the side wall of the holder, the holder can then again be closed with the lid 54. Entirely analogous as set out above, hot water is fed through the fluid inlet opening 46 of the coffee pad. The coffee pad will form a fluid seal at those places of the bottom 66 of the holder where the holder does not have grooves 76. The consequence is that the hot water is pressed through the coffee bed and leaves the coffee pad where the grooves are. The coffee extract then flows via the grooves to the outlet of the holder. The coffee extract then leaves the holder. The grooves of the holder now have a function and determine here where the beverage can leave the coffee pad and bring about a good and uniform extraction of the coffee bed formed by the ground coffee in the coffee pad.

When the coffee extract leaves the holder, the flow restriction of the outlet of the holder still produces a jet of the beverage striking an impact surface 80. The result is that air is beaten into the coffee extract so that, when the coffee extract is collected in a cup then, a fine-bubbled foam layer is provided. Because the coffee pad in this case does not have a rigid shell and a restriction as to the coffee pad 1 of FIGS. 1-6, and because the coffee machine is time-controlled and during the same time period as discussed above hot water is supplied to the coffee pad, a larger amount of coffee extract will be formed, in this example is between 110 and 130 ml. Now, because the flow rate is greater, a jet formed by the beverage as a result of which air at the beverage. It is therefore possible with one and the same coffee machine of FIG. 6 using a regular coffee pad to prepare a café crème, while with the coffee pad according to FIGS. 1-3 a different, more concentrated coffee can be made.

The invention is by no means limited to these embodiments. There may be occasions where the pad 1 according to FIGS. 1-3 does have an outflow opening with a different flow restriction. In that case, the demands on a fluid seal between this pad 1 and the holder may also be different than when the fluid of the pad 1 has a large flow restriction. After all, in the event that the outlet has a lesser flow restriction, the pressure drop across the outlet of the holder will be less so that lower requirements for seal between the pad 1 and the holder apply. In that case, there can also be produced a normal coffee or when a jet of the beverage is produced also a café-crème. In the example of FIG. 6 is a seal 88 present between the lid and the holder. It is also possible that a seal is present between the lid and the top side of the pad according to FIGS. 1-3. In that case, it is no longer important that a seal is present between the pad according to FIGS. 1-3 and the holder. The holder 50 can further come with a handle 90 as shown in FIGS. 3 and 4. Additionally, but not shown in the drawings, it is also possible for the pad to include a handle. In that case the handle can be fixed to the shell and/or the handle and the shell can be manufactured in one piece.

Figure 7:
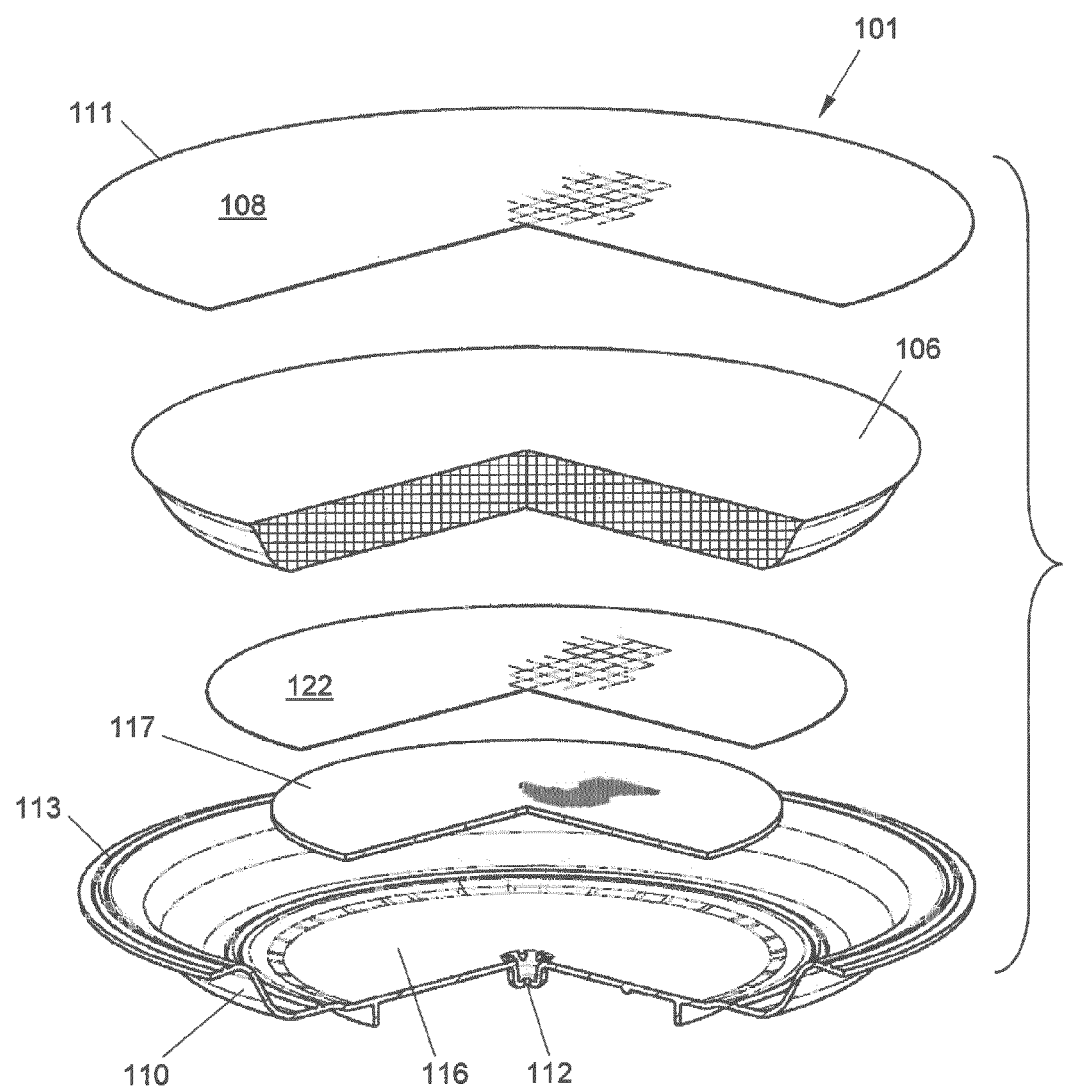
FIG. 7 is an exploded view, partly in cross section, of a second pad according to the invention.

In FIG. 7 a second embodiment of a pad 101 according to the invention is shown in an exploded arrangement. Reference numerals denoting components similar to those of the first embodiment will generally differ by the addition of "100" to their reference numerals. Again the pad 101 defines an interior space for accommodating a beverage preparation product 106, between a flexible first sheet 108 of flexible permeable filtering material and a rigid shell 110. The first flexible sheet 108 is attached to the rigid shell 110 at their respective confronting perimeter edges 111, 113. The second pad 101, notably differs from the first pad 1, in that a bottom 116 of the rigid shell 110 is substantially flat and in that a beverage collecting structure is formed by a porous disc 117, rather than by radial channels and ridges. The porous disc 117 also serves to collect the beverage that exits the coffee bed or beverage preparation product 106 through a second flexible sheet 122 of permeable filtering material and ensures that a homogeneous extract is flowing through the at least one outflow restriction 112. The porous disc 117 can be made of fibers, sintered plastic, or like materials.

Figure 8:
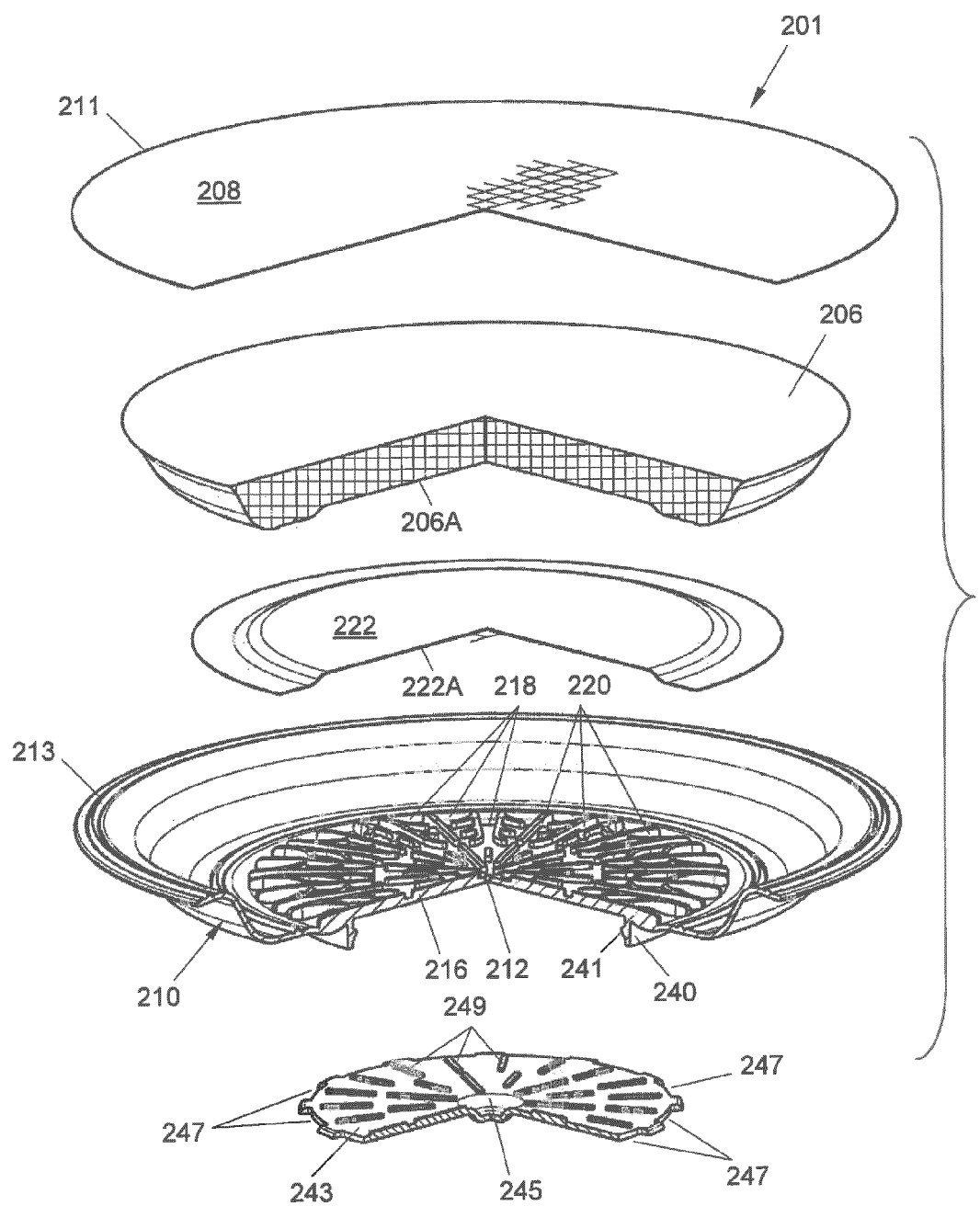
FIG. 8 is an exploded view, partly in cross section, of a third pad according to the invention.
Figure 9:
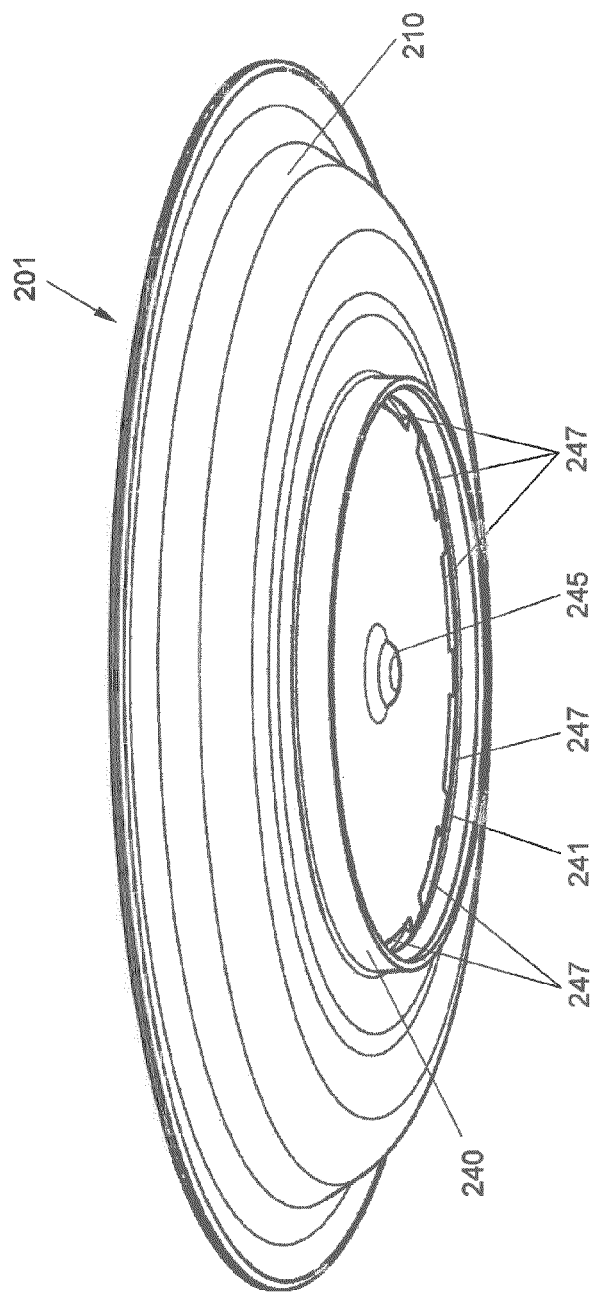
FIG. 9 is a perspective view from below of the third pad of the invention.
Figure 10:
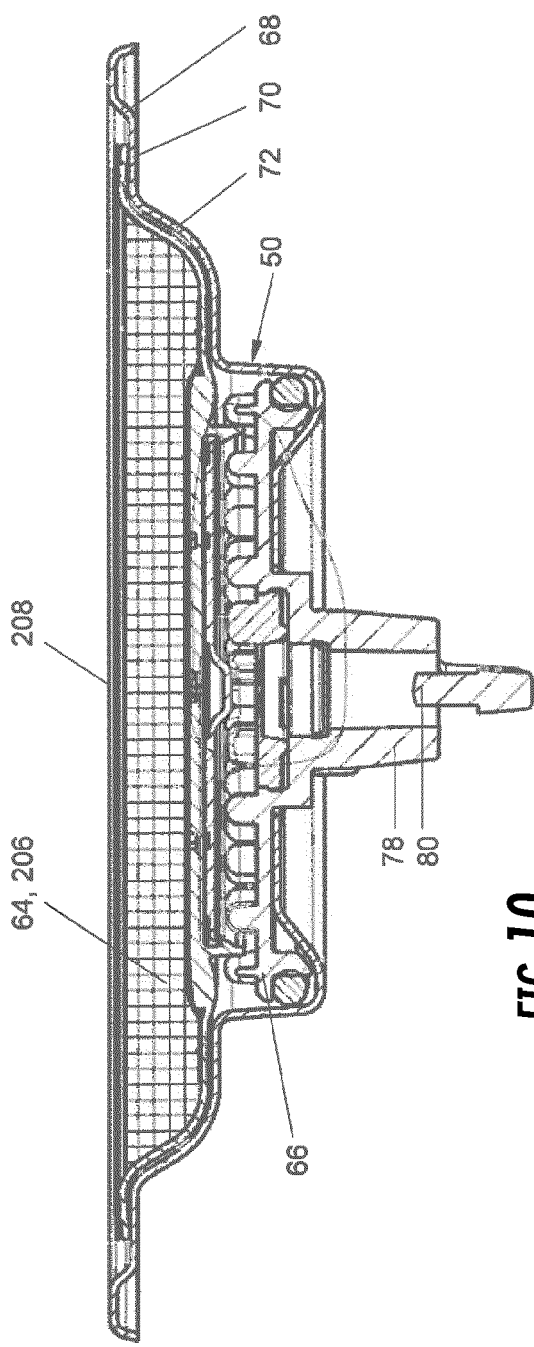
FIG. 10 is a transverse cross section of the third pad of the invention accommodated in the holder of a coffee machine.
Figure 11:
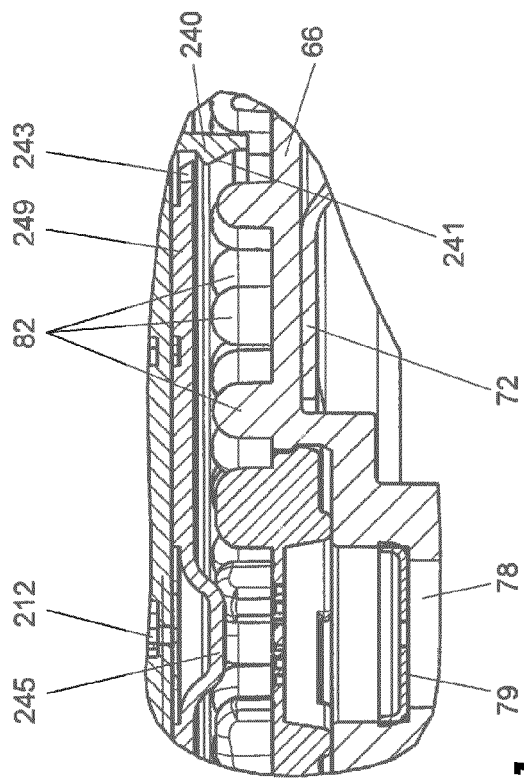
FIG. 11 is a detail on an enlarged scale of FIG. 10.

FIG. 8 shows a third embodiment of pad 201 according to the invention. Similar to the previous embodiments like parts will be indicated by reference numeral differing a further full "100" from those used before. The components forming an interior space for a beverage preparation product 206 include again a first flexible sheet 208 of filtering material and a rigid shell 210. A perimeter edge 211 of the first sheet 208 will be attached to a perimeter edge 213 of the rigid shell 210 by gluing, welding or other conventional bonding techniques. The bottom 216 of the rigid shell 210 is again provided with radial channels 218 defined between radially extending ridges 220 for collecting and guiding the extract fluid for exiting an at least one restricted outlet opening 212. In difference to the first embodiment the radial ridges 220 are slightly raised and the second sheet 222 has a corresponding raised center section 222A supporting a correspondingly raised bottom 206A of the coffee bed or beverage preparation product 206. This detail difference does not alter the principle of the invention and is merely illustrated as an alternative shape that may also be adopted for any of the other embodiments. More in particular the pad 201 of the third embodiment differs by the addition of a deflector for converting the jet exiting from the restriction formed by the at least one outlet opening 212, which under certain circumstances may result in a turbulent flow, when necessary into a laminar flow. When the flow leaving the at least one outlet opening 212 is already laminar, the deflector merely ensures that the flow remains laminar. To this end a deflector plate 243 is attached to the bottom 216 of the rigid shell 210 downstream of the at least one outlet opening 212. The deflector plate attached to the circular rib 240 by a snap-fit detent 241 extending inwardly therefrom as shown in FIG. 8. The deflector plate 243 has a closed central recess 245 to receive a jet of beverage exiting the at least one outlet opening 212. This jet is then deflected radially outwardly of the central recess 245 and spreads out over the upper surface of the deflector plate 243 to escape from cutouts 247 formed about the perimeter of the deflector plate 243. This ensures that the flow rate of the liquid extract flowing out is reduced to such an extent that the flow becomes laminar, rather than turbulent. This is necessary to form a fine bubbled foam layer using a restriction and impact surface provided in the holder of a coffee machine as will be explained below. Additionally radial protrusions 249 may be provided on the upper surface of the deflector plate 243 to determine the cross section of the flow area between the bottom 216 of the rigid shell 210 and the deflector plate 243. From FIG. 9 showing the underside of the third embodiment pad 201, it will be clear how the cutouts 247 allow the fluid extract to leave the rigid shell 210 of the pad 201. Hence the means for establishing a laminar flow is arranged to provide, in use, a shortest flow path for the beverage, which extends between the at least one outlet opening of the pad and the at least one exit opening of the holder. This flow path created by the deflector for deflecting the beverage flow from the outlet opening of the pad is longer than a shortest flow path for the beverage, as it would extend between the outlet opening of the pad and the exit opening of the holder without the means for establishing a laminar flow. In FIG. 10 the third pad 210 according to the invention is accommodated in a holder 50, which in this example is identical to the holder of FIGS. 3-6. Hence the same reference numerals will be used in reference to FIGS. 10 and 11. The holder 50 accommodates the pad 201 in its bowl shaped interior space 64 that is defined by a bottom 66, an upstanding side wall 68, a horizontal ring-shaped first bottom part 70, and a dish-shaped second bottom part 72 that supports the bottom 66. The dish-shaped second bottom part 72 connects to an inner edge 74 of the first flat bottom part 70. In FIG. 11 it can be seen that the closed central recess 245 is directly opposite the outlet 78 of the holder 50. The beverage exiting from the outlet 78 is diverted by the central recess 245, which is closed at the bottom, to flow outwardly in a radial direction over the upper surface of the deflector plate 243. Only fluid beverage extract coming from the outer perimeter of the deflector plate 243 (through the cutouts 247) can reach the outflow opening 78 of the holder through a restriction 79 to impact on the impact surface 80. To reach the outflow opening 78 of the holder the beverage also passes a plurality of protruding nipples 82 on the bottom 66 of the holder that define radical grooves (76 in FIG. 3). Thereby it is ensured that the flow of fluid offered to the outflow opening 78 of the holder is completely laminar, so that when it impacts on the impact surface 80 forms a fine bubble froth layer on top of the obtained beverage.

Figure 12:
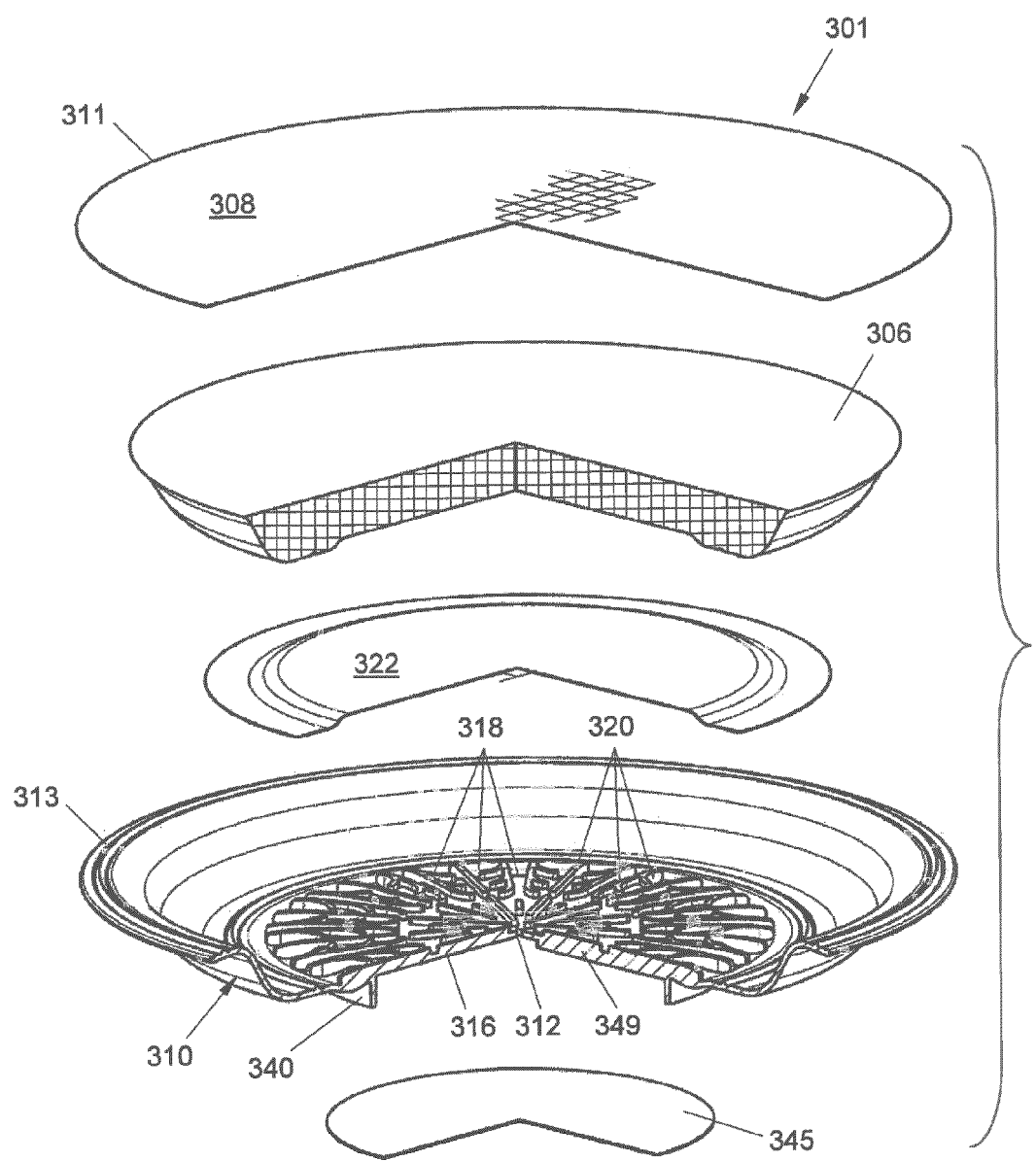
FIG. 12 is an exploded view, partly in cross section of a fourth pad according to the invention.
Figure 13:
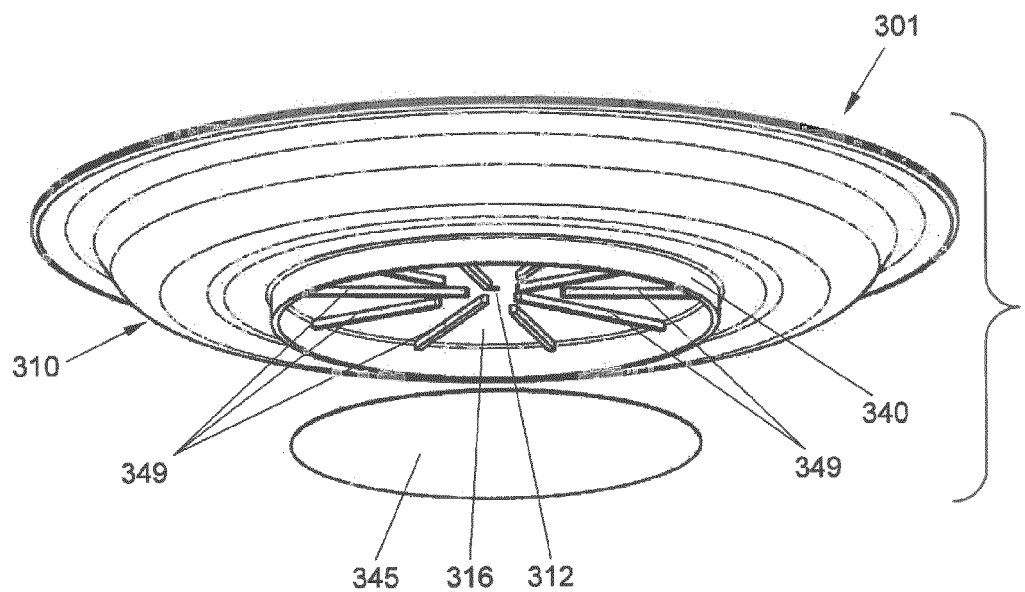
FIG. 13 is a partly exploded view from below of the fourth pad of the invention showing a bottom foil still unattached.
Figure 14:
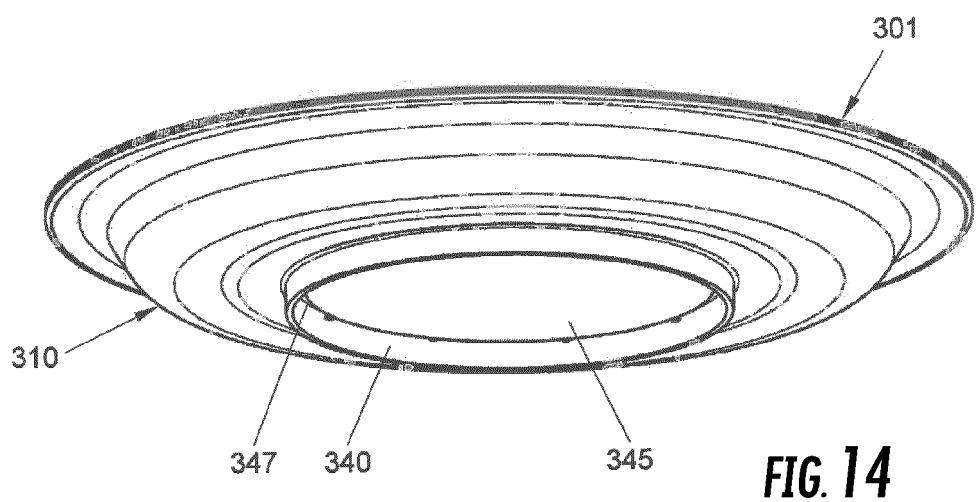
FIG. 14 is a perspective view from below of the fourth pad of the invention with the bottom foil attached.

FIG. 12 is an exploded view showing a fourth embodiment of pad 301 according to the invention. The fourth pad of the invention 301 also has a deflector structure to ensure that a laminar flow of beverage is offered to the outflow opening of the holder. Again a beverage preparation product 306 is accommodated between a first flexible filtration sheet 308 and a rigid shell 310. The flexible first sheet 308 has its perimeter edge 311 heat-sealed or glued to a perimeter edge 313 of the rigid shell 310. The rigid shell 310 has its bottom surface 316 provided with radial channels 318 each defined between adjacent radial protruding ridges 320. Resting on top of the radial ridges 320 is a second flexible sheet 322 of filtration material, separating the beverage preparation product 306 from the channels 318. A central restriction opening 312 is provided to control the total amount of fluid passing through the pad 301 when used in a coffee machine with a time controlled fluid supply means. A deflector foil 345 is sealed, glued, or welded to a lower surface of ridges 349 protruding from the bottom surface 316 and extending radially from the outlet restriction 312 (best seen in FIG. 13). Also best seen in FIGS. 13 and 14 is that the deflector foil 345 has a slightly smaller diameter than a diameter defined by the circular rib 40. With the deflector foil 345 attached a ring-shaped gap 347 remains between an outer edge of the deflector foil 345 and the circular rib 40 allowing outflow of the beverage into a holder (not shown but identical to those of FIGS. 3, 4 and 10). For the beverage preparation with the pad 301 according to the fourth embodiment reference can be made to the description of the third embodiment, which in use if substantially similar. The required laminar flow in the fourth pad 301 is created between the bottom 316 and the deflector foil 345 in a similar way as in the third pad 201 described in reference to FIGS. 8-11 and needs no further explanation.

Figure 15:
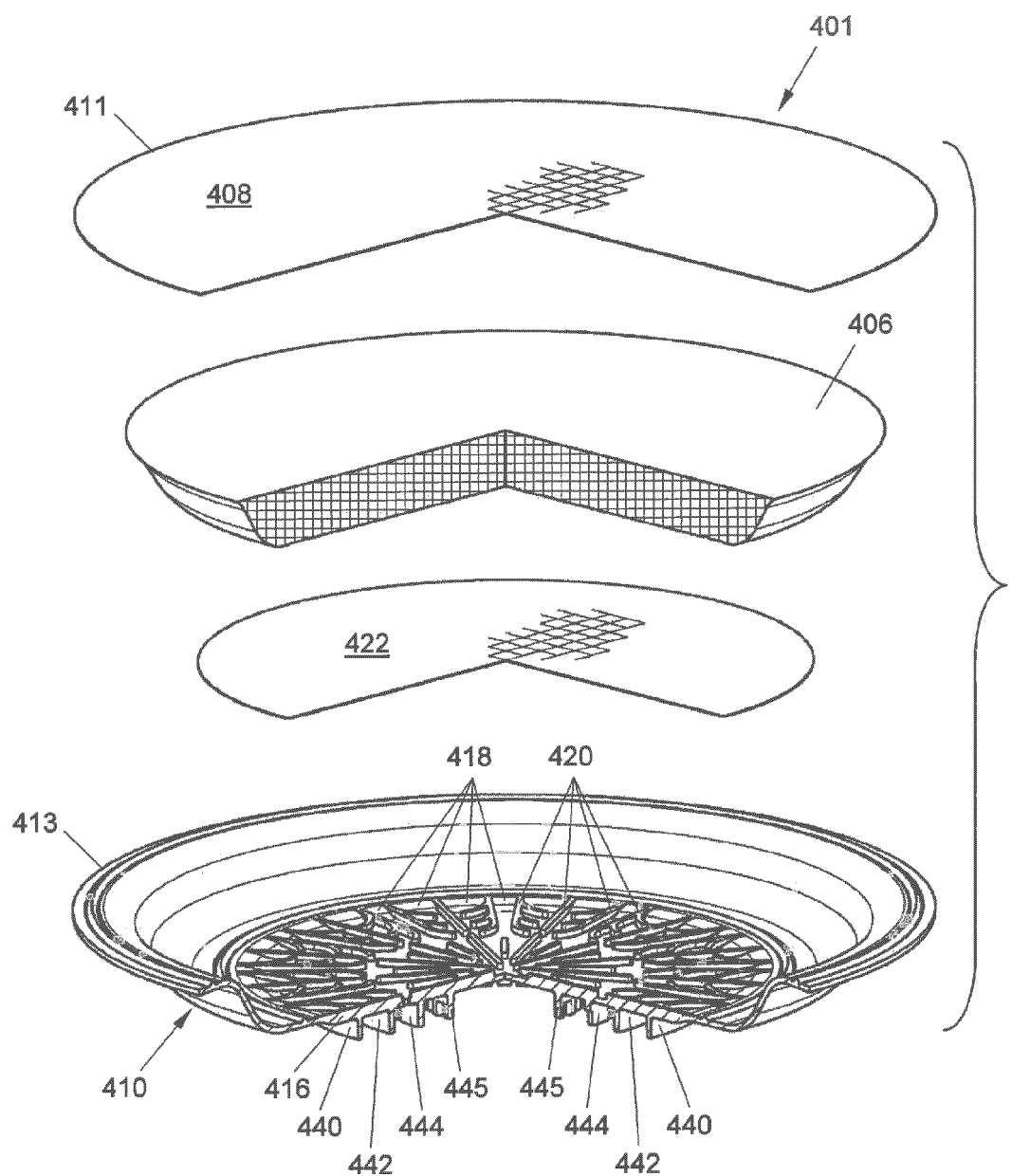
FIG. 15 is an exploded view, partly in cross section, of a fifth pad according to the invention.
Figure 16:
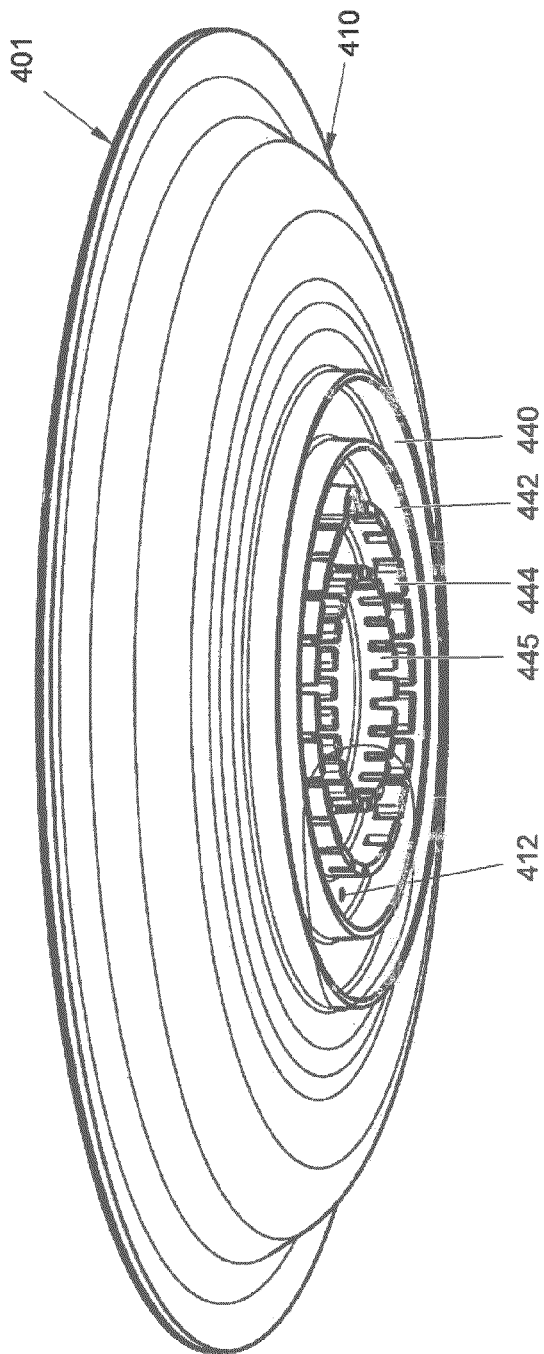
FIG. 16 is a perspective view from below of the fifth pad according to the invention.
Figure 17:
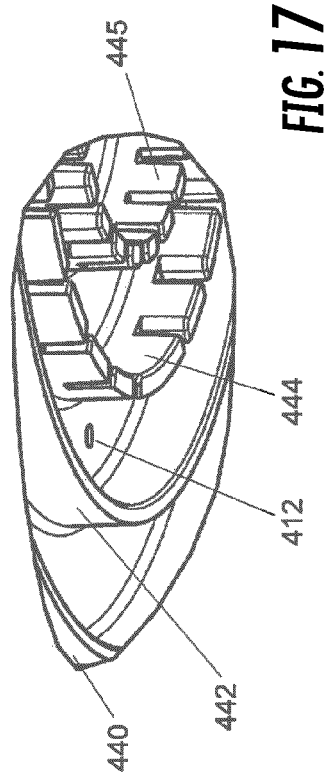
FIG. 17 is an enlarged detail of FIG. 16.
Figure 18:
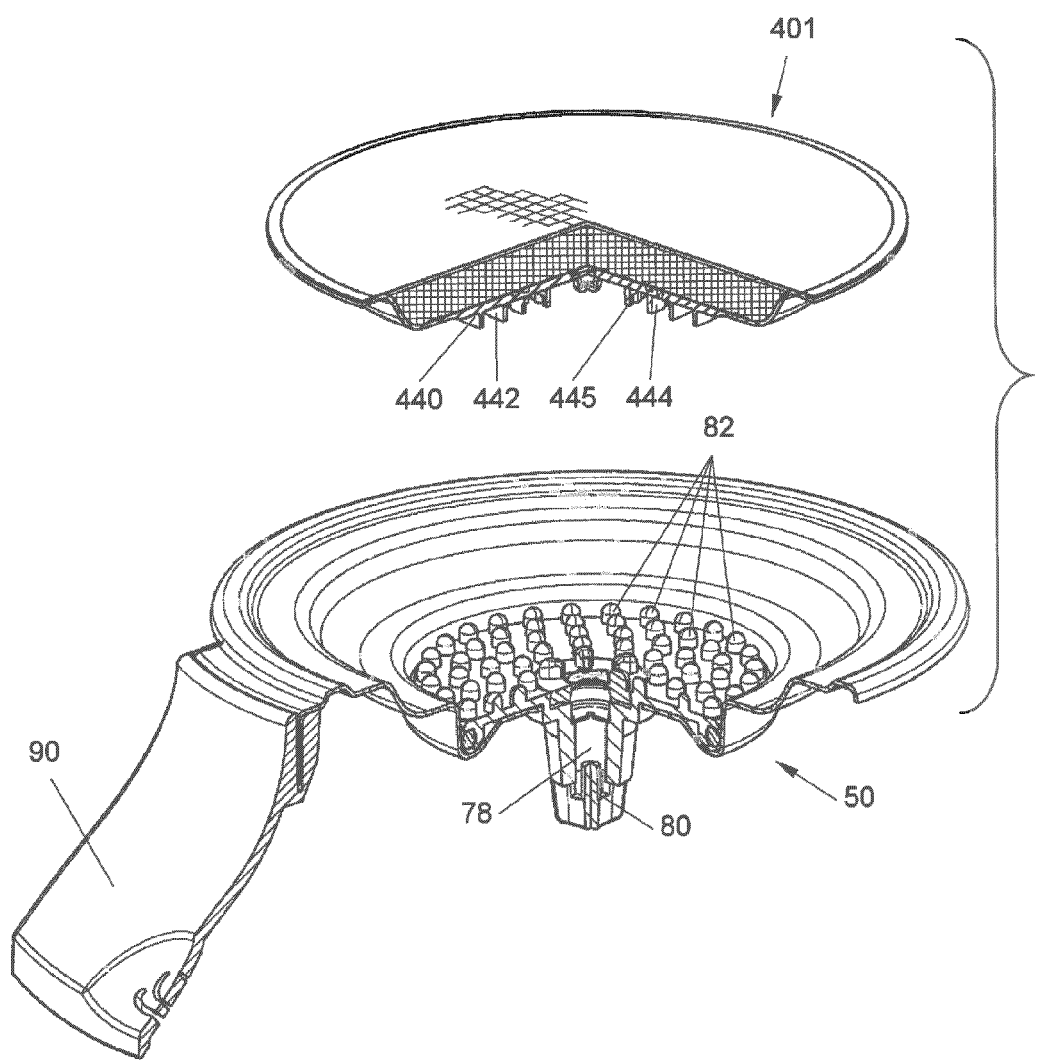
FIG. 18 is a perspective view, partly in cross section, of the fifth pad of the invention in position for insertion into the pad holder of a coffee machine.
Figure 19:
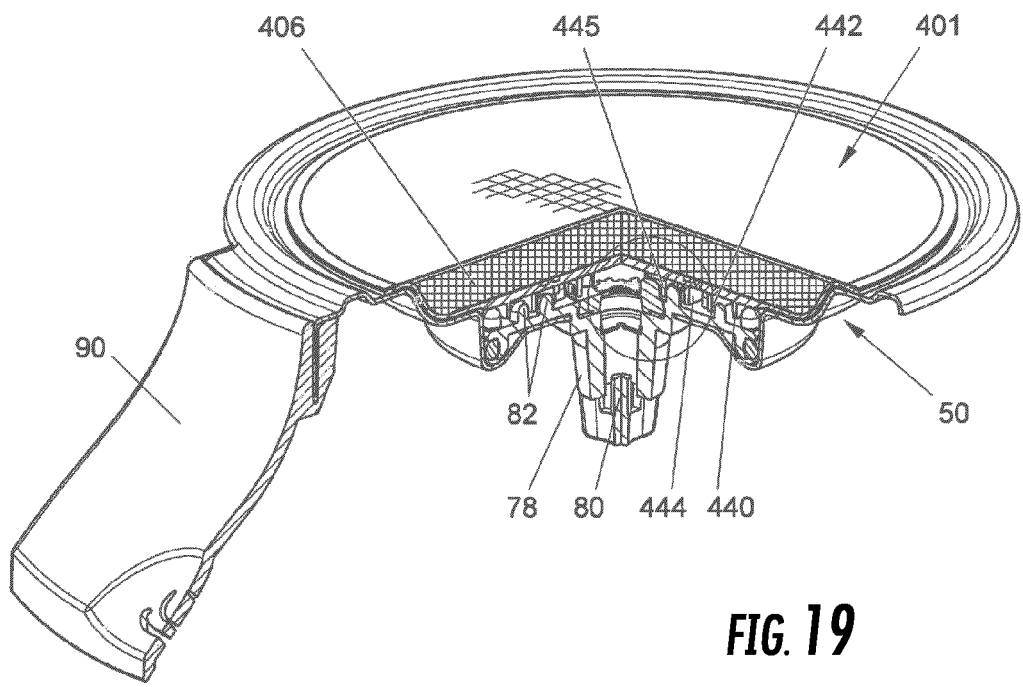
FIG. 19 is a perspective view, partly in cross section, of the fifth pad of the invention, accommodated in the holder of the coffee machine.
Figure 20:
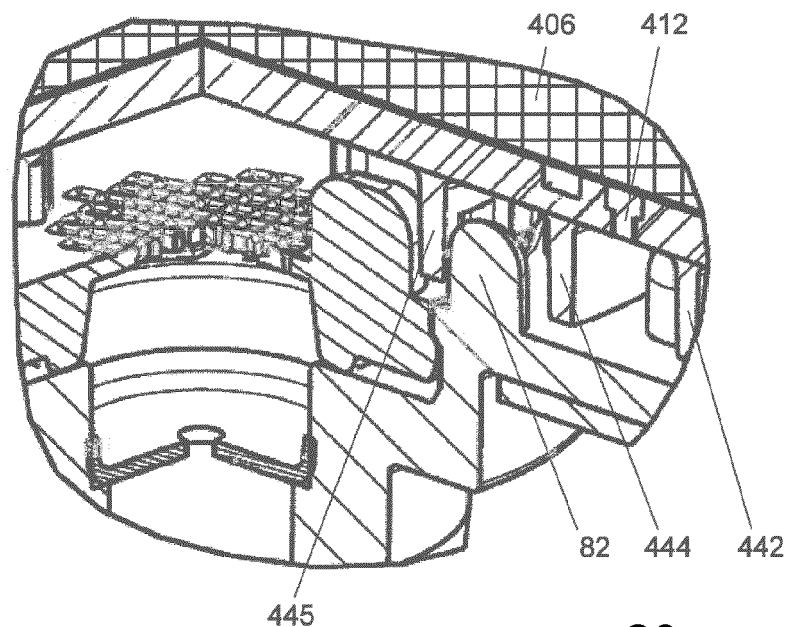
FIG. 20 is a detail on an enlarged scale of FIG. 19.

A fifth embodiment of pad 401 is illustrated in FIG. 15. Again this fifth embodiment includes means for establishing a laminar flow of beverage so that the pad 401 can cooperate with a holder that has its own restriction and a jet impact surface to create a foamy head on a beverage. As with the previous embodiments the beverage preparation product 406 is sandwiched between a flexible first sheet of filtration material 408 and a second slightly smaller second sheet of filtration material 422. The second sheet of filtration material 422 rests on a pattern of radial protrusions 420 defining radial channels 418, on a bottom 416 of a rigid shell 410 for collecting and guiding the beverage extract. The first filtration sheet 408 has its perimeter edge 411 attached to a perimeter edge 413 of the rigid shell 410. In this respect the fifth path 401 is substantially similar to the previous embodiments. However the means for establishing a laminar flow is now embodied as a labyrinth, which is only created with the pad 401 when accommodated in the holder 50 as will be explained in reference to FIGS. 15-20. In reference to FIGS. 15-17, it can be seen that the rigid shell 410 inwardly of a first circular rib 440 has a second circular rib 442. Inwardly and concentrically of the second circular rib 442 is positioned an outer slotted circular rib 444 and an inner slotted circular rib 445. As best seen in FIGS. 16 and 17, at least one restrictive outflow opening 412 is positioned eccentrically in the flat bottom part of the rigid shell between the second circular rib 442 and the outer slotted circular rib 444. In its middle the rigid shell 410 of the fifth pad 401 has no outlet opening so that the beverage can only exit the bottom 416 of the pad 401 outwardly of the outer slotted rib 444, but inwardly of the continuous second circular rib 442. In use, as best shown in FIGS. 18-10, the pad 401 when positioned in the holder 50, has its first and second circular ribs 440, 442 extending between the nipples 82 protruding from the bottom of the holder 50. Also the outer and inner circular slotted ribs 444, 445 are extending in recess that are not occupied by the nipples 82 of the holder. Because the outer and inner circular ribs 444, 445 are slotted the beverage will be forced inwardly from the outlet opening 412 to the outflow opening 78 of the holder through a labyrinth that is formed by the slotted ribs 444, 445 and the relevant confronting nipples 82. The double first and second circular ribs 440, 442 without slots will ensure that the majority of beverage flows inwardly through the labyrinth, and thereby causes the flow to become laminar. A laminar flow then leaves the holder 50 through the outflow opening 78, where it can hit the impact surface 80 to produce a proper foam head on the beverage as it is collected in a receptacle, such as a cup or a mug. As will be clear from the above the labyrinth diverts a plurality of times the flow of the beverage from the outlet opening of the pad.

In FIG. 21 use of a coffee machine 552 marketed under the Senseo® trademark is illustrated for preparing specialty beverages in a two-step process with primary and secondary pads 501, 601. Such specialty beverages can include cappuccino, latte macchiato, wiener mélange, or like hot drinks. At least one of the primary and secondary pads 501, 601 is a pad according to the invention as described in reference to any one of the FIGS. 1 to 20. The Senseo® coffee machine 552 accepts a removable holder 550 that is provided with a handle 590 for its manipulation. In turn the holder 550 can adapt the primary pad 501, which in FIG. 21 is shown ready for insertion. Upon insertion of the primary pad 501 into the holder 550 as described in the examples hereinabove, a lid 554 can be closed to extract or dissolve the beverage preparation product in the primary pad 501. The coffee machine 552 is provided with a water reservoir 560 from which water is supplied and heated in a known manner, as also schematically illustrated in FIG. 6. This step is repeated for the second pad 601, while one and the same receptacle, such as a cup or mug remains positioned under a dispensing funnel 579 of the coffee machine 552 to collect the beverage ingredient from both the primary and the secondary pads 501, 601. When a normal size of cup 15 to be filled with beverage ingredients from two successive pads 501, 601 it may be necessary to reduce the amount of beverage using a restriction as explained above. A restriction in the pad, or in the holder will achieve this effect with the proposed Senseo® coffee machine 552, because the fluid supply is time controlled.

Figure 22:
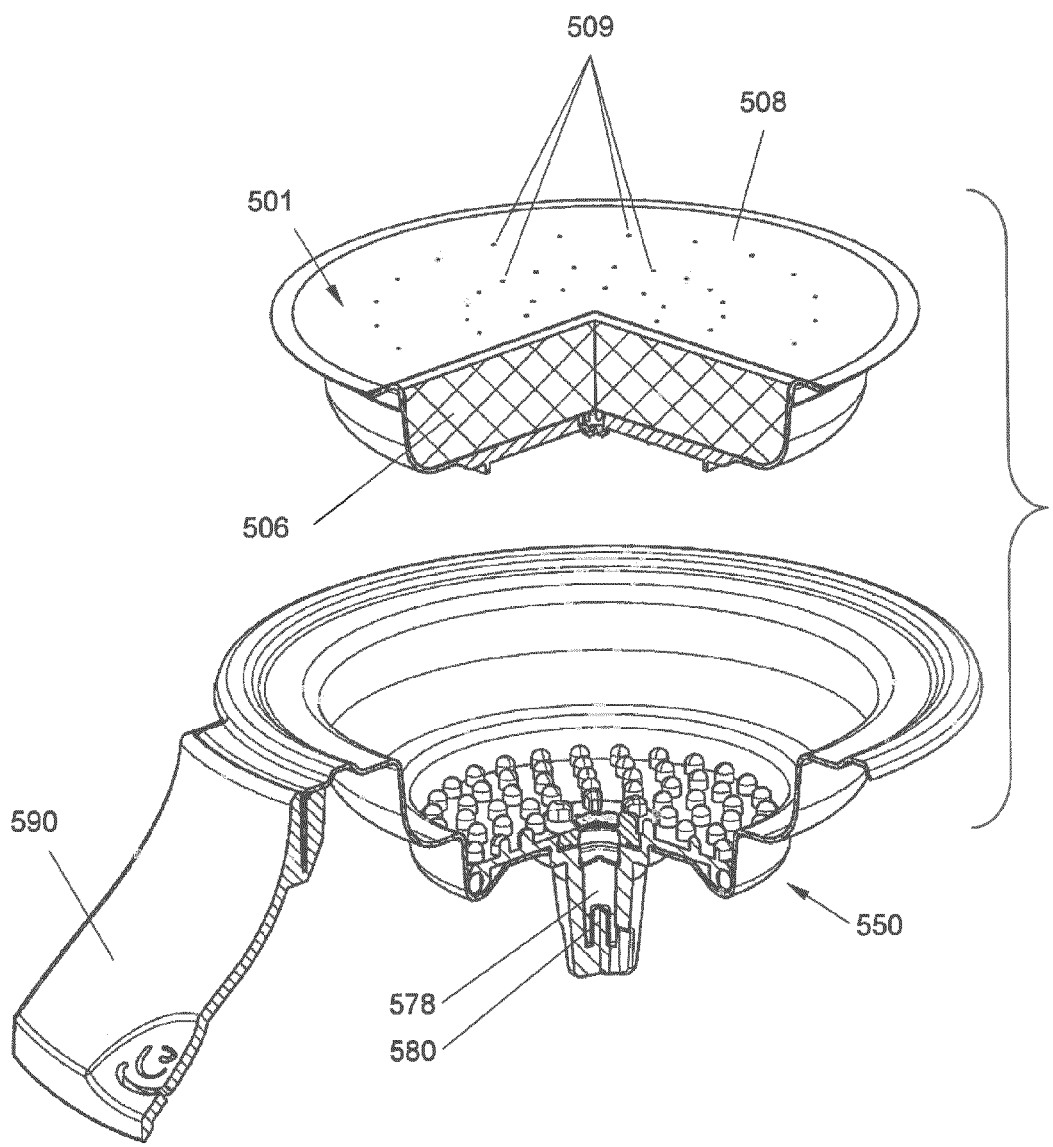
FIG. 22 in explosion shows an alternative pad not necessarily according to the invention, ready for insertion into the pad holder of the coffee machine of FIG. 21.

Illustrated in FIG. 22 is an example of a preferred primary pad 501 for the preparation of a cappuccino beverage having a white foamy head. In this particular example the primary pad 501 is filled with a soluble substance 506, such as in particular a creamer. In use hot water will enter a top sheet 508 through a plurality of small apertures 509, which ensure that the water wets the soluble substance 506 homogeneously. Advantageously the top sheet 508 is substantially impermeable to liquid, and the plurality op of small inlet apertures 509 are distributed evenly in a pattern. In use the apertures 509 will cause jets of hot water to enter the pad at spaced locations to assist in dissolving the soluble beverage preparation substance 506. Preferably, the jets of hot water also cause swirls to further promote dissolving of the soluble beverage preparation product 506. It has been determined that inlet aperture sizes of 150 to 350 μm, preferably 200 to 300 μm, more preferably about 225 μm and a total number of inlet apertures 509 in a range of 35 to 45, give the best yield without a possible blockage of individual of openings 509, or flow resistance in general, becoming a worry.

Figure 23:
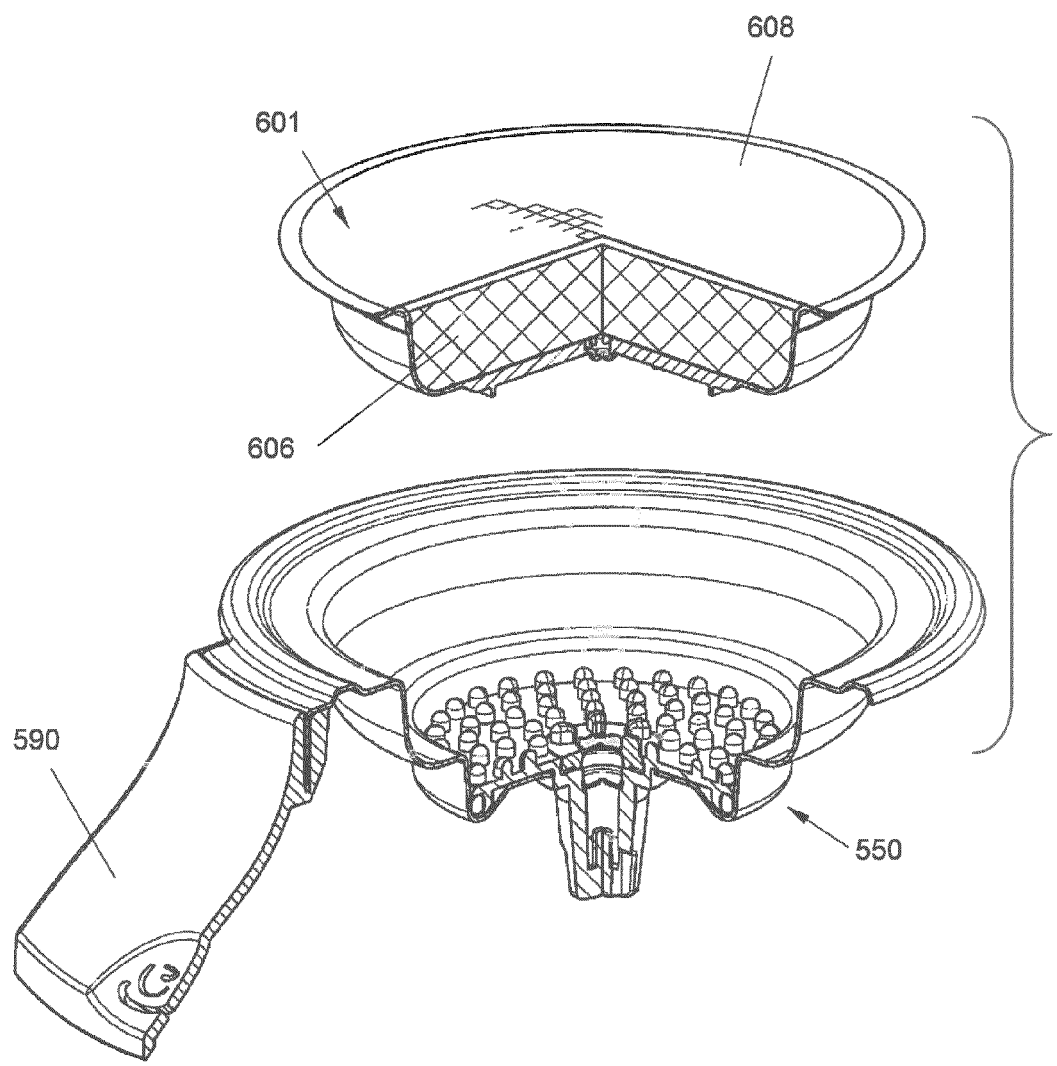
FIG. 23 in explosion shows a pad according to the invention ready for insertion into the pad holder of the coffee machine of FIG. 21.

A foamy head of creamer is formed by the impact surface 580 of the outflow opening 578 of the holder 550. After finishing the first step with the primary pad 501, the secondary pad 601 will be inserted in the holder 550 of the coffee machine as illustrated in FIG. 23. The secondary pad 601 includes an extractable substance 606, in this example ground coffee. The secondary pad 601 is preferably one of the first and second embodiments described above, which are without means for establishing a laminar outflow. This is because the white foam head of the previously prepared creamer ingredient will float on the coffee extract. Hence it is not necessary to present the coffee beverage with fine bubble foam. In use hot water will permeate through a top filter sheet 608 of the secondary pad 601.

This two step process can also be adapted for producing latte macchiato, wiener mélange or like hot drinks, whereby use is made of a pad that is associated with a restriction that reduces the amount of beverage in a coffee machine with a time controlled hot water supply.

Figure 24:
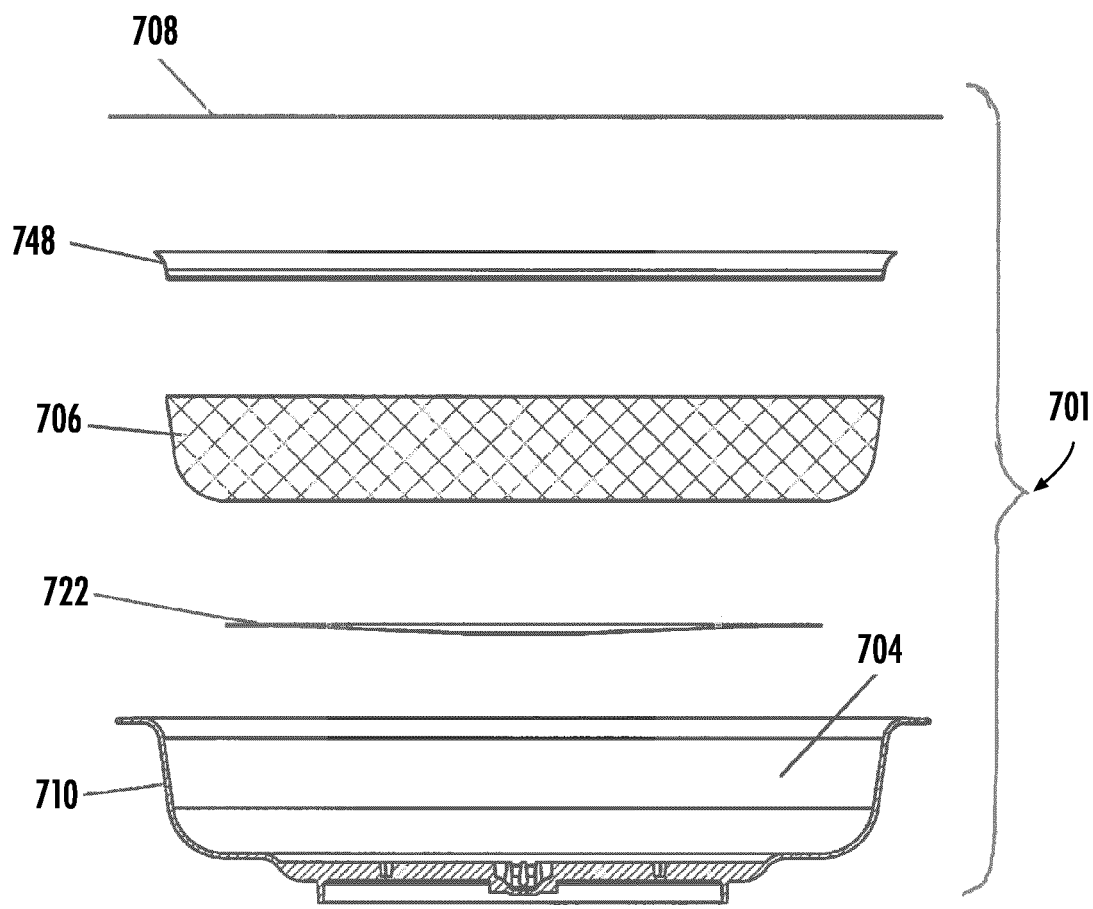
FIG. 24 is an exploded view in transverse cross section of a further alternative pad according to the invention.
Figure 25:
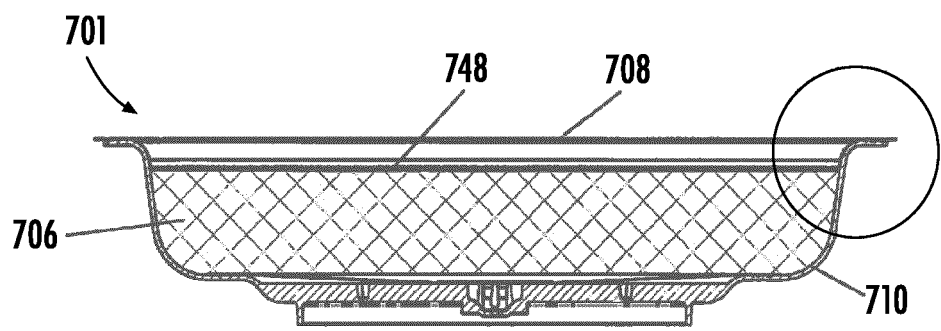
FIG. 25 in transverse cross section shows the alternative pad of FIG. 24 in its assembled form.
Figure 26:
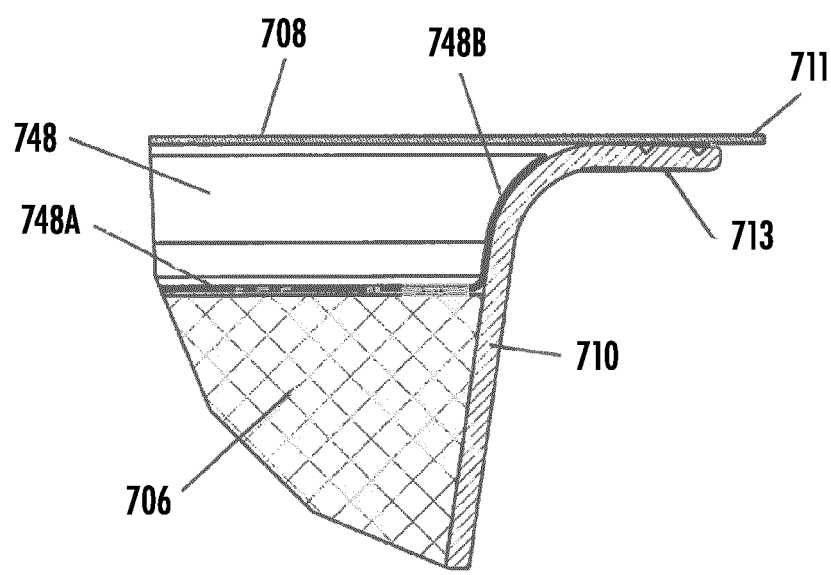
FIG. 26 shows a partial detail of the alternative pad encircled in FIG. 25 on an enlarged scale.

The interior space of a pad necessary to accommodate a soluble beverage preparation substance, such as a creamer, is usually larger than the space necessary to accommodate an extractable beverage preparation substance, such as ground coffee. Nonetheless it may be preferable to employ uniform pad sizes for the primary and secondary pads in a two-step beverage preparing process as described in reference to FIGS. 21-23, and irrespective of the beverage ingredient contained in the pad. During brewing a problem of channel forming may occur when ground coffee is accommodated within a space large enough to hold a creamer ingredient. To avoid this problem an alternative pad 701 for holding a bed of ground coffee 706 is shown in FIGS. 24-26. Shown in FIG. 24 is an exploded view in transverse cross section of the alternative pad 701. In analogy to the first through fifth embodiments described above the alternative pad 701 contains a bed of roast and ground coffee 706 that is accommodated within an interior space 704 of a bowl-shaped rigid shell 710. Underneath the coffee bed 706 is positioned a lower second filter sheet 722, and a top first filter sheet 708 closes the open top of the rigid shell 710. The size of the interior space 704 has been adapted to the requirements for containing a soluble creamer ingredient, which leaves a head space when filled with ground coffee. To enable use of a single uniform size of rigid shell 710, irrespective of the beverage ingredient in the pad, the improvement includes an additional permeable spacer filter 748. The additional spacer filter 748 enables the bed of ground coffee 706 to be contained in the rigid shell 710, which is of a size large enough to be filled with a soluble creamer, when the additional spacer filter 748 is not used. As seen in assembled form in FIG. 25 the coffee bed 706 is retained by the spacer filter 748, so that the coffee bed cannot be disturbed by the hot water that in use permeates under pressure through the first filter sheet 708. This prevents channel forming, which would have an adverse effect on the taste of the beverage. As further shown in the enlarged detail of FIG. 26, the first filter sheet 708 is attached through its perimeter edge 711 to a flanged perimeter 713 of the rigid shell 710. The spacer filter 748 has a flat bottom 748A and a flared upstanding wall 748B. The flared upstanding wall 748B of the spacer filter 748 snuggly engages the curved transition portion from a body of the rigid shell 710 towards its flanged perimeter 713, and may be further retained in position by the first filter sheet 708. The spacer filter 748 can conveniently be made from any suitable porous or perforated flexible, semi-rigid, or rigid material. Conventional methods can be used when necessary to attach or seal the flared upstanding wall 748B of the spacer filter 748 to the interior wall of the rigid shell. In an alternative embodiment of the pad which comprises the spacer filter the first filter sheet may be deleted so that the spacer filter in fact functions also as the first filter sheet.

Accordingly a pad is disclosed that is suitable for use in coffee machine for making one or two cups of beverage. In use, with the coffee machine an aqueous fluid such as water is supplied under pressure to the pad so that the fluid is forced through the pad for obtaining a beverage that then exits the pad. The pad includes a covering with an interior space that is filled with a beverage preparation product for preparing the beverage, which beverage preparation product is a product such as ground coffee extractable with a fluid, such as water. The covering is formed by an optionally disc-shaped first sheet and an optionally disc-shaped rigid shell, wherein the first sheet and the shell around their adjacent perimeter edges are connected to each other. The shell is equipped with at least one outlet, wherein preferably on the interior space of the pad in a bottom of shell a fluid collecting structure is provided, advantageously embodied as channels in fluid connected with the at least one outlet. The pad is equipped with an optionally disc-shaped second sheet that is positioned on the bottom of the shell optionally covering the fluid collecting structure. The second sheet is located between the beverage preparation product and the shell, wherein the flexible first sheet and the second sheet each form a filter permeable to a fluid such as water and beverage, which can pass and that forms a barrier for the beverage preparation product so that, when in use, a fluid fed under pressure at the flexible first sheet of the pad flows through the first sheet to the beverage preparation product so that the beverage is formed which then flows through the second sheet and optionally via the fluid collecting structure, such as the channels, and leaves the pad through the at least one outlet.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . ." should be read as: "component configured for . . ." or "member constructed to . . ." and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

What is claimed is:

1. A kit of parts for use in a coffee machine for preparing a beverage, the kit of parts comprising:
   a pad for use in the coffee machine, the pad is configured to receive an aqueous fluid that is supplied under pressure to the pad so that the fluid is forced through the pad that then exits the pad as the beverage, the pad comprising:
   a covering defining an interior space that is filled with a beverage preparation product for preparing the beverage wherein the beverage preparation product includes a product including ground coffee extractable with the aqueous fluid, wherein the covering comprises a flexible first sheet and a rigid shell, wherein the rigid shell includes a sidewall, an annular flange, and a bottom wall, wherein the annular flange includes an outer edge and an inner edge, wherein the sidewall extends between the bottom wall and the inner edge of the annular flange, wherein the flexible first sheet has a circular shape and a perimeter edge, wherein the perimeter edge of the flexible first sheet is welded to the annular flange of the rigid shell, and wherein the bottom wall of the rigid shell includes at least one outlet opening;

a second sheet positioned within the rigid shell and on the bottom wall of the rigid shell, wherein the second sheet is located between the beverage preparation product and an inner side of the rigid shell, wherein the flexible first sheet forms a first filter and the second sheet forms a second filter that allow the aqueous fluid and the beverage to pass and that forms a barrier for the beverage preparation product so that, when in use the aqueous fluid under pressure supplied to the flexible first sheet of the pad flows through the flexible first sheet to the beverage preparation product so that the beverage is formed which beverage then flows through the second sheet and via the at least one outlet opening leaves the pad, and wherein the at least one outlet opening includes a flow restriction for the beverage;

at least one further pad containing a soluble product;

a pad holder separate from the pad and the at least one further pad, the pad holder having a bowl-shaped interior space defined by a bottom of the pad holder, an upstanding side wall of the pad holder, an annular ledge of the pad holder;

wherein the pad on the flow restriction has a largest through-flow area in a direction, in use, perpendicular to a beverage flow through the flow restriction not exceeding 0.54 mm$^2$; and wherein the flow restriction has a circular shape with a diameter less than 0.83 mm.

2. The kit of parts according to claim 1, wherein the through-flow area is within a range from 0.26 mm$^2$ to 0.32 mm$^2$.

3. The kit of parts according to claim 1, wherein the diameter is within a range from 0.58 mm$^2$ to 0.64 mm.

4. The kit of parts according to claim 1, wherein the rigid shell includes an outer side opposite the inner side.

5. The kit of parts according to claim 4, wherein the outer side of the rigid shell faces the bottom of the pad holder, the upstanding side wall of the pad holder, and the annular ledge of the pad holder, and wherein the inner side of the rigid shell faces the beverage preparation product.

6. The kit of parts according to claim 4, wherein the rigid shell of the pad includes at least one circular rib extending from the outer side of the rigid shell.

7. The kit of parts according to claim 1, wherein the bottom wall of the rigid shell includes a fluid collecting structure that is in fluid communication with the at least one outlet opening.

8. The kit of parts according to claim 7, wherein the fluid collecting structure includes channels that are in fluid communication with the at least one outlet opening, and wherein the second sheet, which is positioned on the bottom of the rigid shell, covers the channels, so that the beverage flows through the second sheet to the at least one outlet opening via the channels.

9. The kit of parts according to claim 8, wherein the channels are integrally formed in the bottom wall of the rigid shell.

10. The kit of parts according to claim 8, wherein the bottom wall of the rigid shell comprises a flat portion, and wherein the second sheet extends over the flat portion.

11. The kit of parts according to claim 10, wherein the second sheet extends solely over the flat portion of the bottom wall and the second sheet and the flat portion of the bottom wall are parallel to each other.

12. The kit of parts according to claim 8, wherein the bottom wall of the rigid shell comprises a flat portion and wherein the channels extend only in the flat portion of the bottom wall.

13. The kit of parts according to claim 12, wherein the second sheet defines a perimeter, and the channels of the rigid shell extend only within the perimeter.

14. The kit of parts according to claim 12, wherein each channel extends from a position remote of a continuous annular outer edge of the flat portion in the direction of the at least one outlet opening.

15. The kit of parts according to claim 14, wherein the shortest distance between each of the channels and the outer edge of the flat portion is greater than 10% of a maximum diameter of the bottom wall of the rigid shell, wherein the maximum diameter is measured in the plane of the flat portion.

16. The kit of parts according to claim 1, wherein the annular flange of the rigid shell is substantially flat.

17. The kit of parts according to claim 1, wherein the sidewall of the rigid shell slopes downwardly and inwardly from the inner edge of the flange toward the bottom wall.

18. The kit of parts according to claim 17, wherein the annular flange of the rigid shell and the annular ledge of the rigid shell extend parallel to each other.

19. The kit of parts according to claim 1, wherein the rigid shell and the second sheet each have a circular shape.

20. The kit of parts according to claim 1, wherein the pad contains 5-10 grams of roast and ground coffee.

21. The kit of parts according to claim 1, wherein the second sheet comprises a perimeter edge, and the perimeter edge of the second sheet is welded to a flat portion of the bottom wall of the rigid shell.

22. The kit of parts according to claim 1, wherein the second sheet of the pad is made of a flexible material.

23. The kit of parts according to claim 1, wherein at least one of the flexible first sheet and the second sheet of the pad is made of a non-woven material.

24. The kit of parts according to claim 23, wherein at least one of the flexible first sheet and the second sheet is manufactured from filtering paper.

25. The kit of parts according to claim 23, wherein at least one of the flexible first sheet and the second sheet is made up of at least 70% cellulose.

26. The kit of parts according to claim 23, wherein one of the flexible first sheet and the second sheet is made up for at least 80% of cellulose.

27. The kit of parts according to claim 23, wherein one of the flexible first sheet and the second sheet is made up for at least 90% of cellulose.

28. The kit of parts according to claim 1, wherein the rigid shell of the pad is constructed of a resin or cardboard.

29. The kit of parts according to claim 28, wherein the resin is a plastic, a biodegradable plastic or a bio-based plastic.

30. The kit of parts according to claim 29, wherein the plastic is a polypropylene.

31. The kit of parts according to claim 1, wherein the flexible first sheet of the pad is flat.

32. The kit of parts according to claim 1, wherein the second sheet of the pad is flat.

33. The kit of parts according to claim 31, wherein the second sheet of the pad is flat and wherein the flexible first sheet and the second sheet are parallel to each other.

34. The kit of parts according to claim 1, the pad further including a member configured for establishing, in use, a laminar flow of the beverage arranged in use to be positioned in the pad holder, wherein the pad holder includes a restricted exit opening and a jet impact surface to create a bubbled foamy head on the beverage.

35. The kit of parts according to claim 34, wherein the member configured for establishing the laminar flow includes a labyrinth for diverting the flow of the beverage a plurality of times the flow of the beverage from the outlet opening of the rigid shell.

36. The kit of parts according to claim 35, wherein the labyrinth is formed by at least one slotted circular rib of the pad, which extends downwardly from the rigid shell and which is adapted to extend in a recess formed between nipples protruding from a bottom of the pad holder, when in use the pad is inserted in the pad holder.

37. The kit of parts according to claim 1, wherein the rigid shell comprises only one outlet opening.

38. The kit of parts according to claim 1, further including a package containing the pad, and the at least one further pad.

39. The kit of parts according to claim 38, wherein the package contains a first plurality of pads, and a second plurality of further pads.

40. The kit of parts according to claim 1, wherein one of the pad and the at least one further pad is marked as a primary pad for a two-step beverage preparation process, while the other of the pad and the at least one further pad is marked as a secondary pad for the two-step beverage preparation process.

41. The kit of parts according to claim 40, wherein the pad is the secondary pad and the at least one further pad is the primary pad comprising the soluble product.

42. The kit of parts according to claim 1, further comprising a fluid seal between the pad and the pad holder that reduces flow of fluid around the pad from a top side of the pad to an exit opening of the pad holder when the pad is inserted in the pad holder.

43. The kit of parts according to 42, wherein the fluid seal includes a static seal that provides a sealing engagement between the pad and the pad holder relying solely on gravity, and a dynamic fluid seal providing in use a sealing engagement between the pad and the pad holder as a result of fluid pressure applied to a top of the pad.

44. The kit of parts according to claim 43, wherein the static fluid seal is formed by contact between the outer edge of the rigid shell, which extends outwardly and downwardly, and the annular ledge of the pad holder.

45. The kit of parts according to claim 43, wherein the dynamic fluid seal is formed between an outer portion of the pad and the pad holder at locations positioned at a smaller distance from the center of the pad than the location of the static fluid seal.

46. The kit of parts according to claim 1, wherein the pad contains 6-9 grams of ground coffee.

47. A kit of parts for use in a single serve coffee machine for preparing a beverage, the kit of parts comprising:
  a first pad for use in the single serve coffee machine, the first pad is configured to receive an aqueous fluid that is supplied under pressure to the first pad so that the aqueous fluid is forced through the first pad and then exits the first pad as the beverage, the first pad comprising:
    a flexible first sheet having a perimeter edge,
    a rigid shell having an annular flange, a sidewall, a bottom wall, and at least one outlet opening, wherein the flexible first sheet is bonded to the annular flange of the rigid shell, wherein the flexible first sheet and the rigid shell form a covering that defines an interior space that is filled with a beverage preparation product for preparing the beverage, and
    a second sheet positioned on the bottom wall of the rigid shell, wherein the second sheet is located between the beverage preparation product and the bottom wall of the rigid shell and wherein the flexible first sheet forms a first filter and the second sheet forms a second filter that allow the aqueous fluid and the beverage to pass and that forms a barrier for the beverage preparation product so that, wherein when in use the aqueous fluid under pressure is supplied to and flows through the flexible first sheet of the first pad to the beverage preparation product so that the beverage is formed which beverage then flows through the second sheet and leaves the first pad via the at least one outlet opening, and wherein the at least one outlet opening includes a flow restriction for the beverage; and
  a second pad containing a soluble product;
  a pad holder separate from the first pad and the second pad, the pad holder having a bowl-shaped interior space defined at least partially by a bottom wall, an upstanding sidewall, and an annular ledge, wherein the annular ledge of the pad holder is configured to support the annular flange of the rigid shell of the first pad, and the bottom wall of the pad holder is configured to support the bottom wall of the rigid shell of the first pad.

* * * * *